Figure 1:
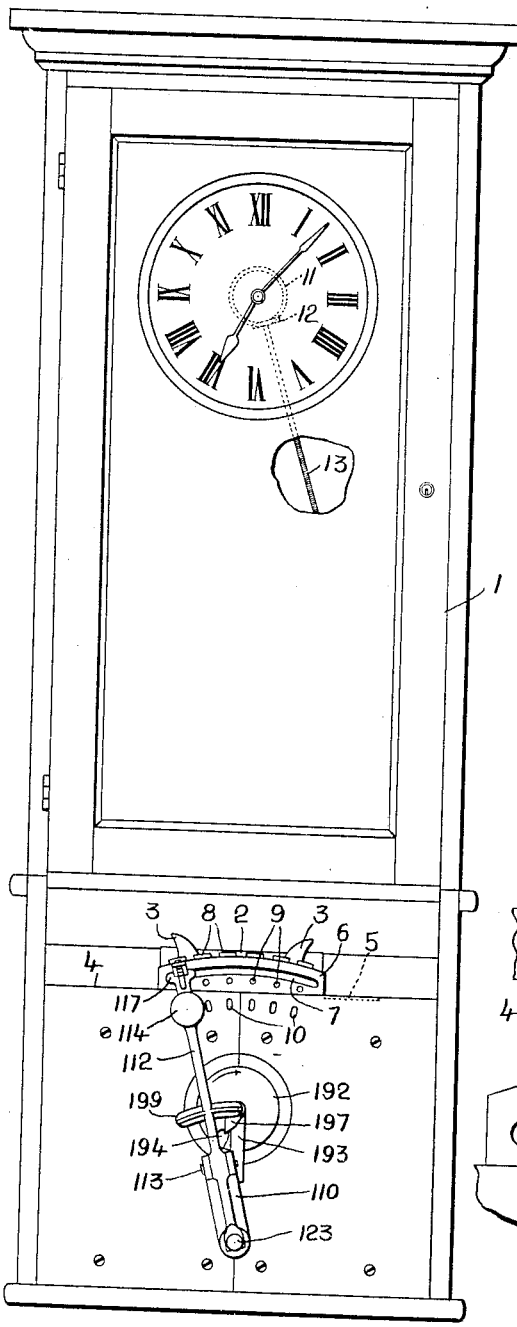

C. T. HAWLEY.
WORKMAN'S TIME RECORDER.
APPLICATION FILED AUG. 31, 1908.

920,866.

Patented May 4, 1909.
9 SHEETS—SHEET 1.

Witnesses.
Thomas J. Drummond
Joseph M. Ward.

Inventor.
Charles T. Hawley,
by Mosby Gregory attys.

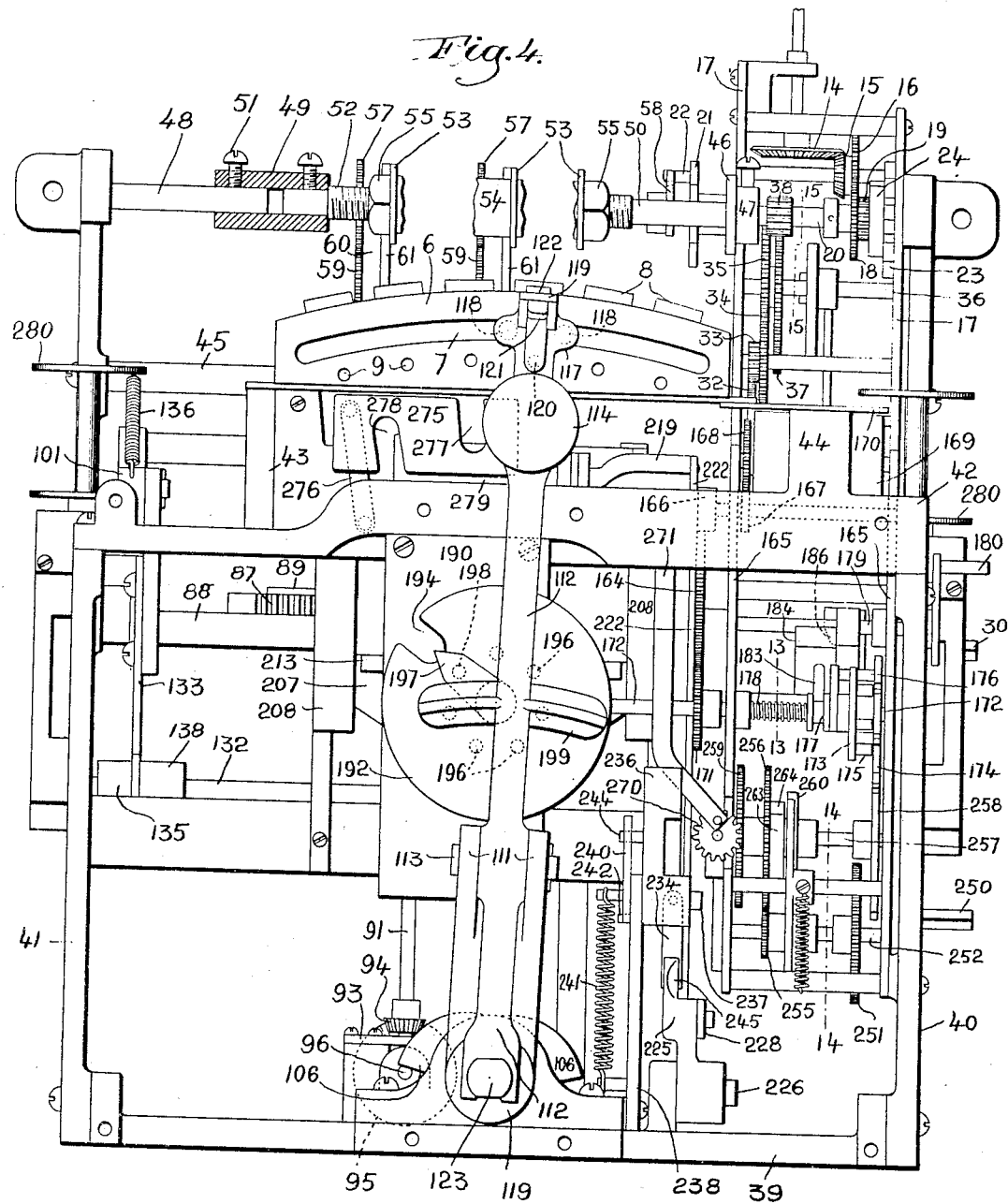

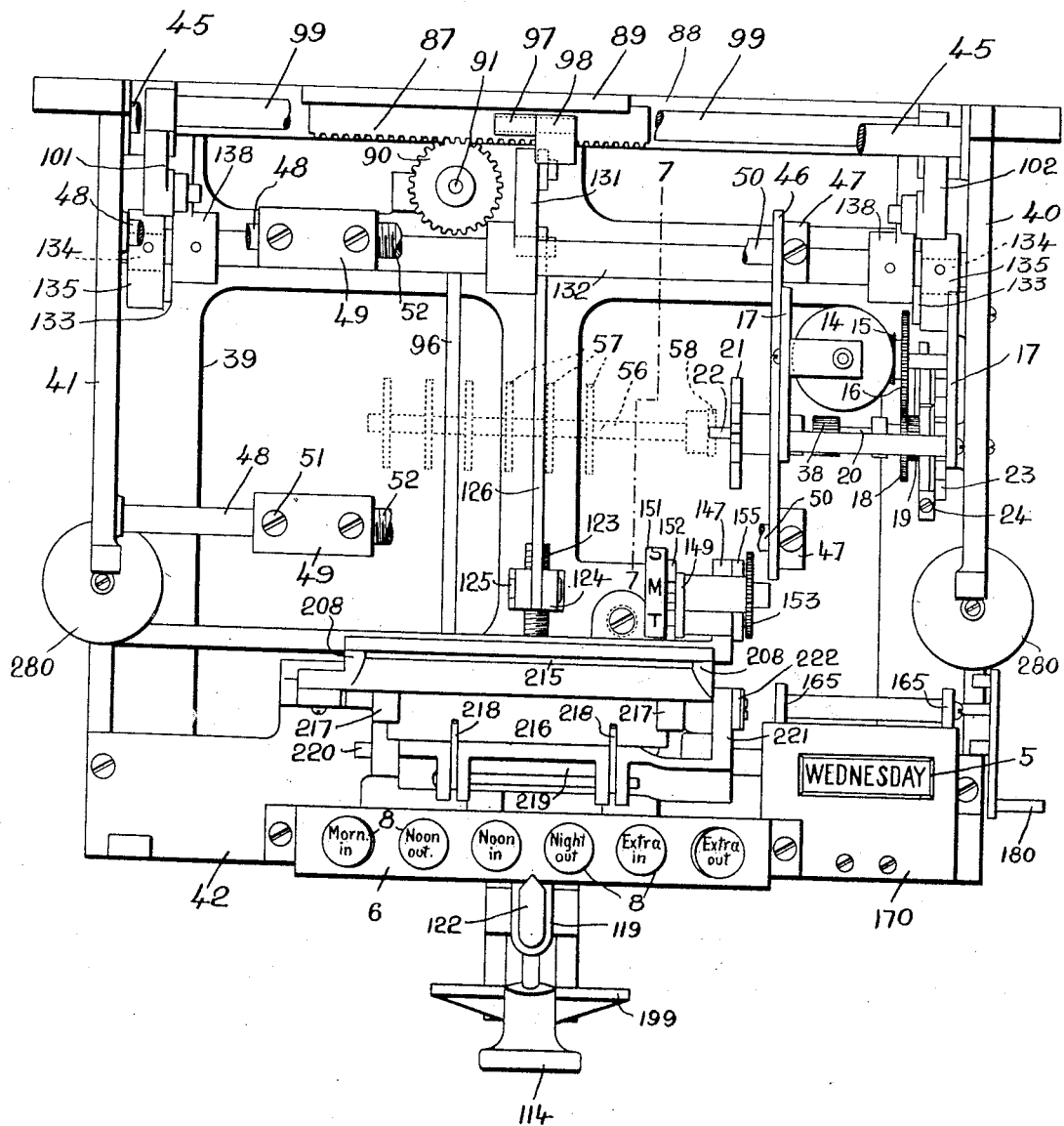

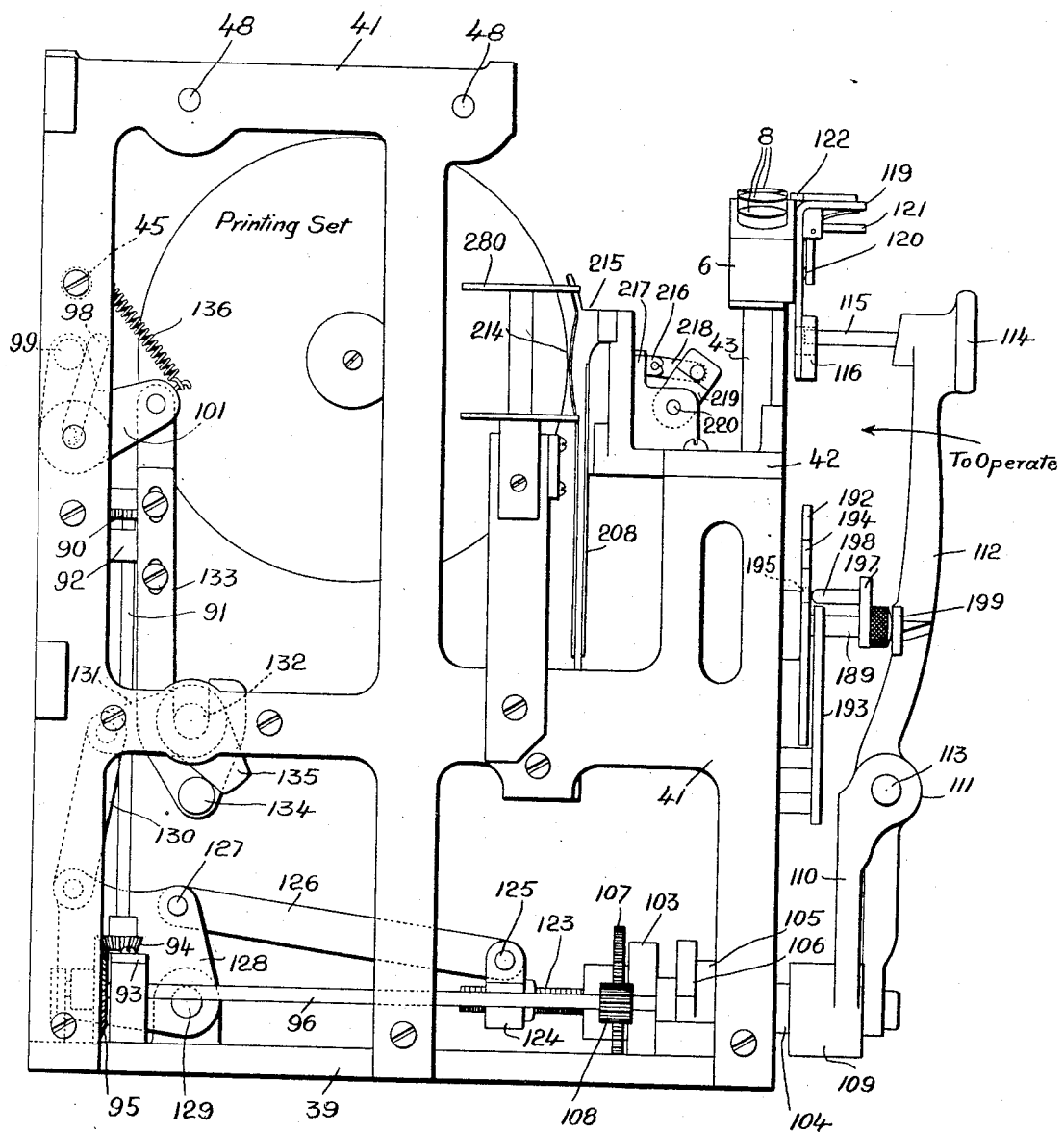

C. T. HAWLEY.
WORKMAN'S TIME RECORDER.
APPLICATION FILED AUG. 31, 1908.

920,866.

Patented May 4, 1909.
9 SHEETS—SHEET 5.

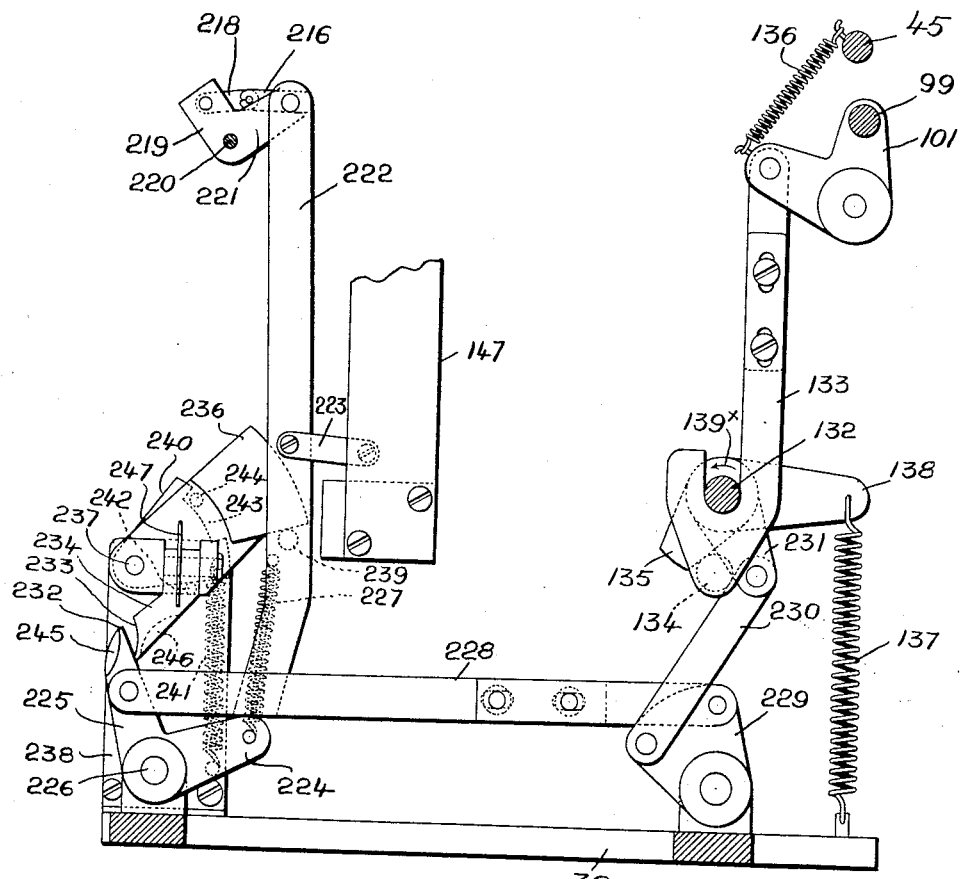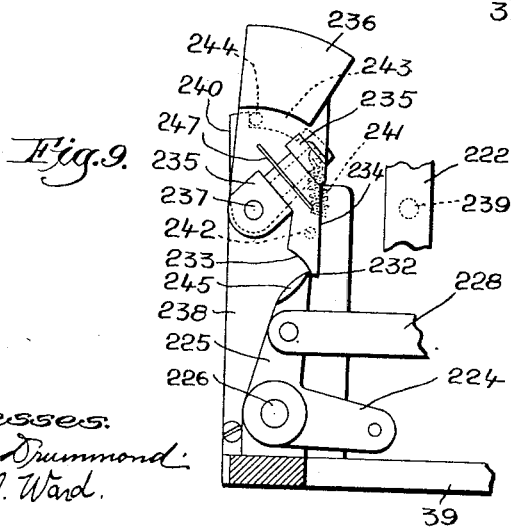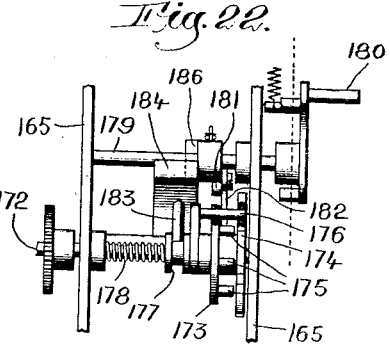

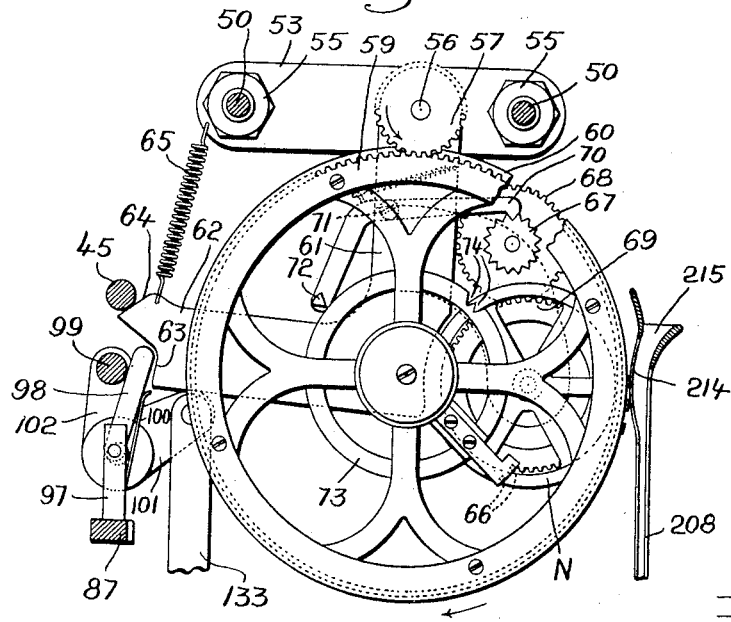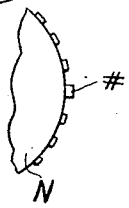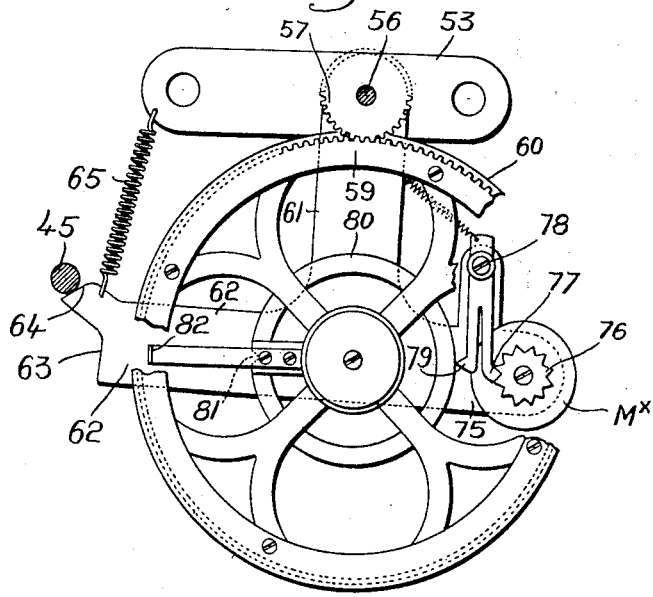

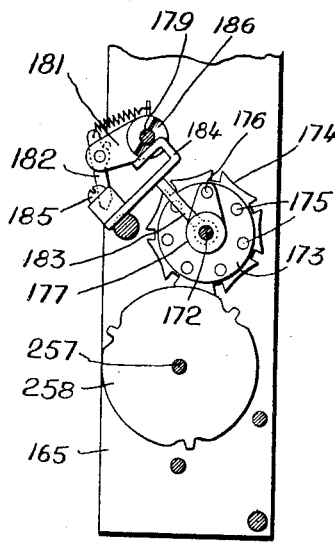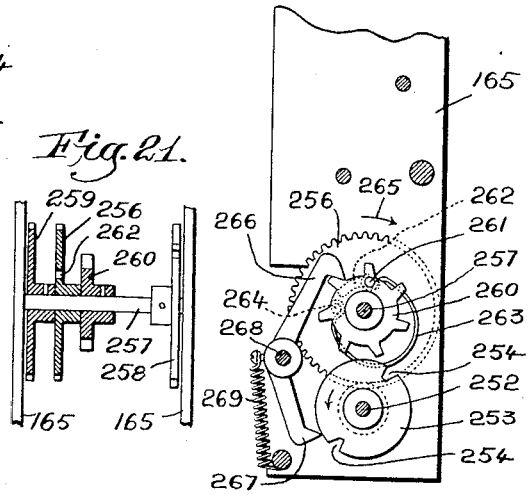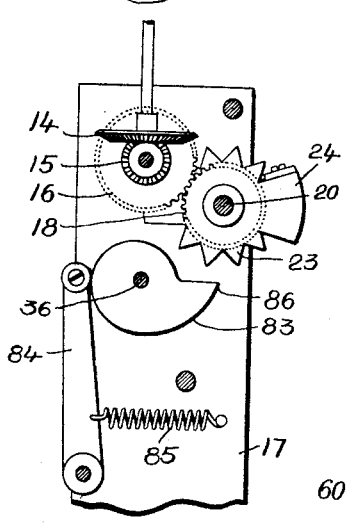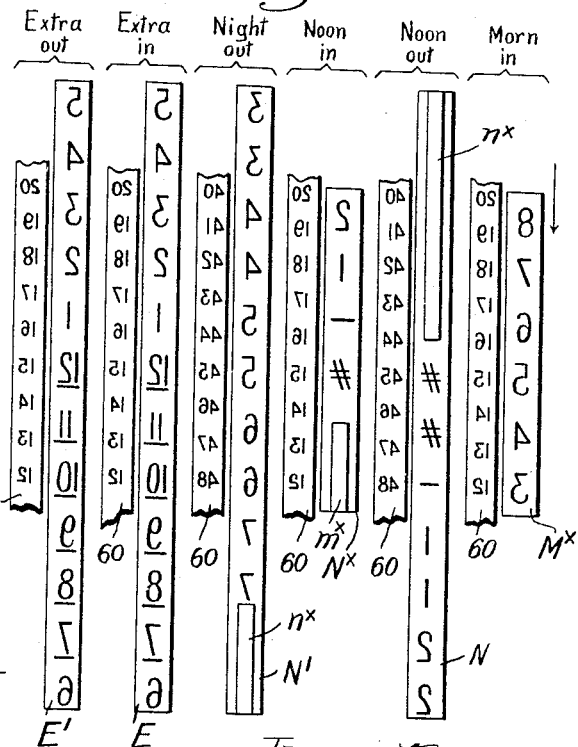

C. T. HAWLEY.
WORKMAN'S TIME RECORDER.
APPLICATION FILED AUG. 31, 1908.
920,866.
Patented May 4, 1909.
9 SHEETS—SHEET 9.
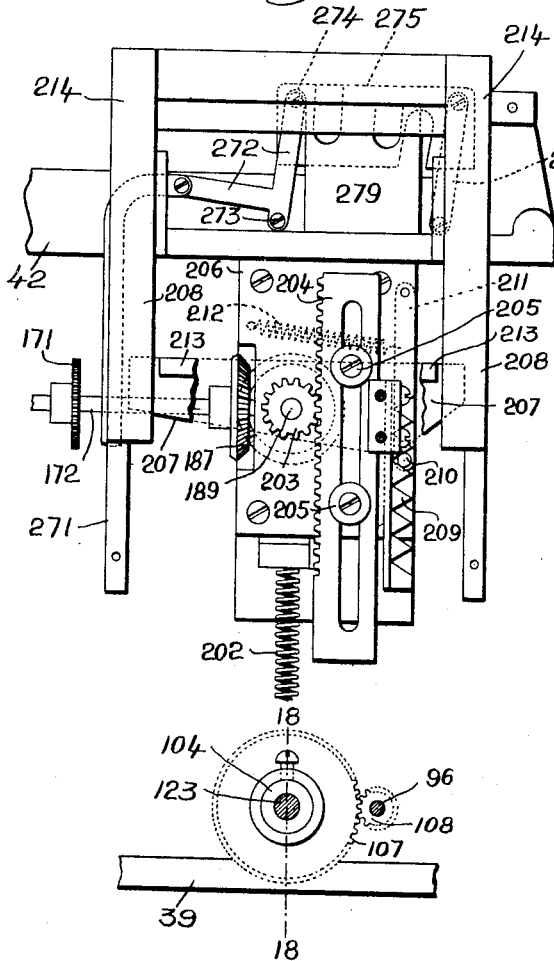
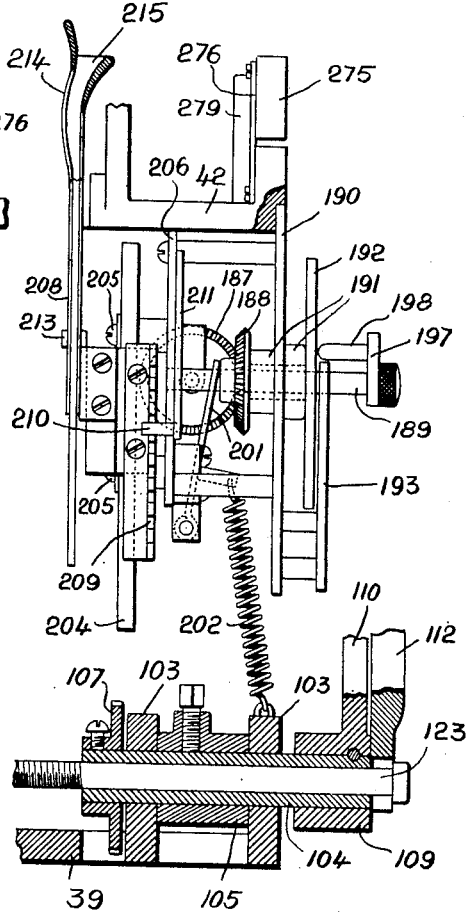
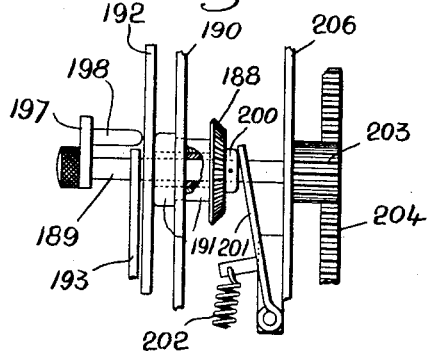
Witnesses
Thomas J. Drummond
Joseph M. Ward
Inventor
Charles T. Hawley,
by Crosby Gregory
atty's

UNITED STATES PATENT OFFICE.

CHARLES T. HAWLEY, OF GARDNER, MASSACHUSETTS, ASSIGNOR TO SIMPLEX TIME RECORDER COMPANY, OF GARDNER, MASSACHUSETTS, A CORPORATION OF MASSACHUSETTS.

WORKMAN'S TIME-RECORDER.

No. 920,866.  Specification of Letters Patent.  Patented May 4, 1909.

Application filed August 31, 1908. Serial No. 451,070.

*To all whom it may concern:*

Be it known that I, CHARLES T. HAWLEY, a citizen of the United States, and resident of Gardner, county of Worcester, State of Massachusetts, have invented an Improvement in Workmen's Time-Recorders, of which the following description, in connection with the accompanying drawing, is a specification, like characters on the drawing representing like parts.

This invention relates to apparatus for recording on a suitable card or other check the actual time of a workman at his place of employment, each employee having his individual card, which in practice is used for one week, although if desired any other suitable fixed period of time may be selected.

In many factories or other business concerns there are fixed hours for beginning and ending a day's work, with a noon period having fixed limits. The record of each employee, determining as it does his compensation for a given period, must be so made that tardiness in beginning work, either in the morning or at the return after noon will be indicated, as well as absences for longer or shorter periods during regular work hours, and if he quits work before the proper time a record thereof must also be made, in order that proper deductions may be made for lost time. Various forms of apparatus have been devised with such objects in view, the majority of which indicate on the card or other check the exact time at which the record is made, so that at the end of a given period, say a week, the lost time is figured up from a given card, deducted from the full time for that period, and the compensation for the week is thereby determined. In United States Patent No. 12761 reissued to me March 10, 1908, such an apparatus is shown and described, the apparatus being of the type wherein the workman, by a selective movement, sets the apparatus in readiness to make the proper "in" or "out" record on the card, and thereupon actuates the apparatus to make the record. That apparatus is so arranged that records for each day are made in vertical columns on the card, the columns being arranged in parallelism in the sequence of the days of the week, and the selective movement by the workman effects the proper position of the card, in the card receiver or guide, relatively to the stamping or recording instrumentality A daily change, in the relative position of the card and said instrumentality which occurs once in every twenty-four hours, is governed by periodically changing means, and while said means is rendered operative by the employee who first operates the apparatus after such a periodic change the employees have no control thereover. So, too, the card receiver is fixed, in said patent, and the time recording instrumentality is movable bodily relatively thereto, by the periodically changing means.

In another United States Patent No. 842132 granted to Blair January 22, 1907, for a recording apparatus the actual time is not given for the "in" and "out" records, but time out, *i. e.*, all lost time, is recorded as so many minutes, or so many hours and fractions thereof, whereby the collation of the matter on a given card is easily and quickly effected at the end of a given period, say one week. The Blair apparatus is so constructed and arranged that when the employee is on time, either when beginning or stopping work, the record made on his card is an arbitrary character.

My present invention is in a measure a combination of certain principles involved in both of the patents referred to, with various novel features of construction, operation and arrangement not present in either of the specified mechanisms. Herein the apparatus is arranged to make a clean record, by the use of an arbitrary character, whenever the employee begins and ends his work without lost time, and the lost time is recorded as a certain definite period, in minutes, or hours and minutes, as the case may be, as in Blair, the columns for successive days of the week being arranged in parallelism transversely of the card, the records for any given day being made successively in its proper horizontal space.

Each employee must see that the apparatus is in readiness to make the proper "in" or "out" record on his card, and if it is not in such condition he must properly set it by a selective movement before he operates it, so it will be manifest that the positions of the different records on the card, for a given day, are under the control of the employee to the extent indicated.

The change in the position of the card in the card receiver or guide from day to day is herein effected manually and in practice by the employee who first operates the apparatus on a new day, but I have devised time-controlled means to prevent the operation of the apparatus to make any record whatever unless the proper positioning of the card for a particular day has been effected manually. Said time controlled means operates automatically to change or set periodically a controlling member as for instance at midnight every twenty-four hours, and when such controlling member is set the apparatus can be operated to make a record only after the card positioning means has been brought into proper relation with the recording instrumentality. That is, if at midnight on Monday, for instance, the controlling member has been set automatically for the following day, Tuesday, no record whatever can be made until the manually operated card positioning means has been actuated to bring it into such relation with the recording instrumentality that all records for the period between midnight Monday and midnight Tuesday will be made on the Tuesday space on the card. This prevents an employee from making a record on his card until the apparatus has been set for the current day. I have also provided means to prevent the making of records for morning hours in afternoon hours, and vice versa, thus obviating any opportunity for an employee to absent himself during one part of the day and get a record therefor during another part of the day.

As it is convenient to have means for recording extra or overtime I have provided devices for making such records, in actual time, the cards to be used in the apparatus having proper vertical columns, for such extra time as well as those for the different in and out records. The selective device, under the control of the employee, causes the record to be printed or stamped on the card by a particular set of recording or printing members, the printing or recording instrumentality being composed of a plurality of such sets. I have also so constructed the apparatus embodying my present invention that the platen is subjected to a sharp hammer-blow at the instant the record is made, whereby a clear and well defined impression is made upon the card.

These and various novel features of my invention will be fully described in the subjoined specification and particularly pointed out in the following claims.

Figure 2:
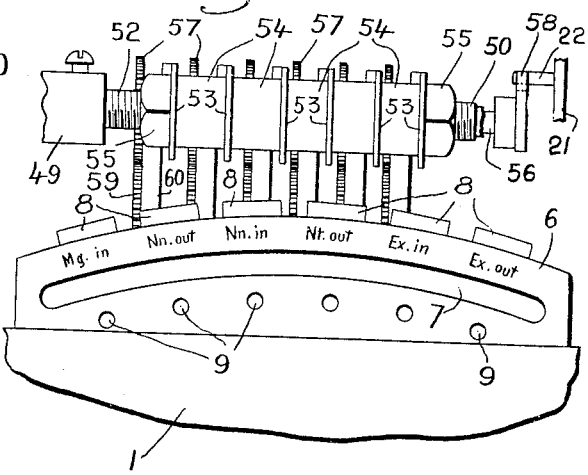
Figure 7:
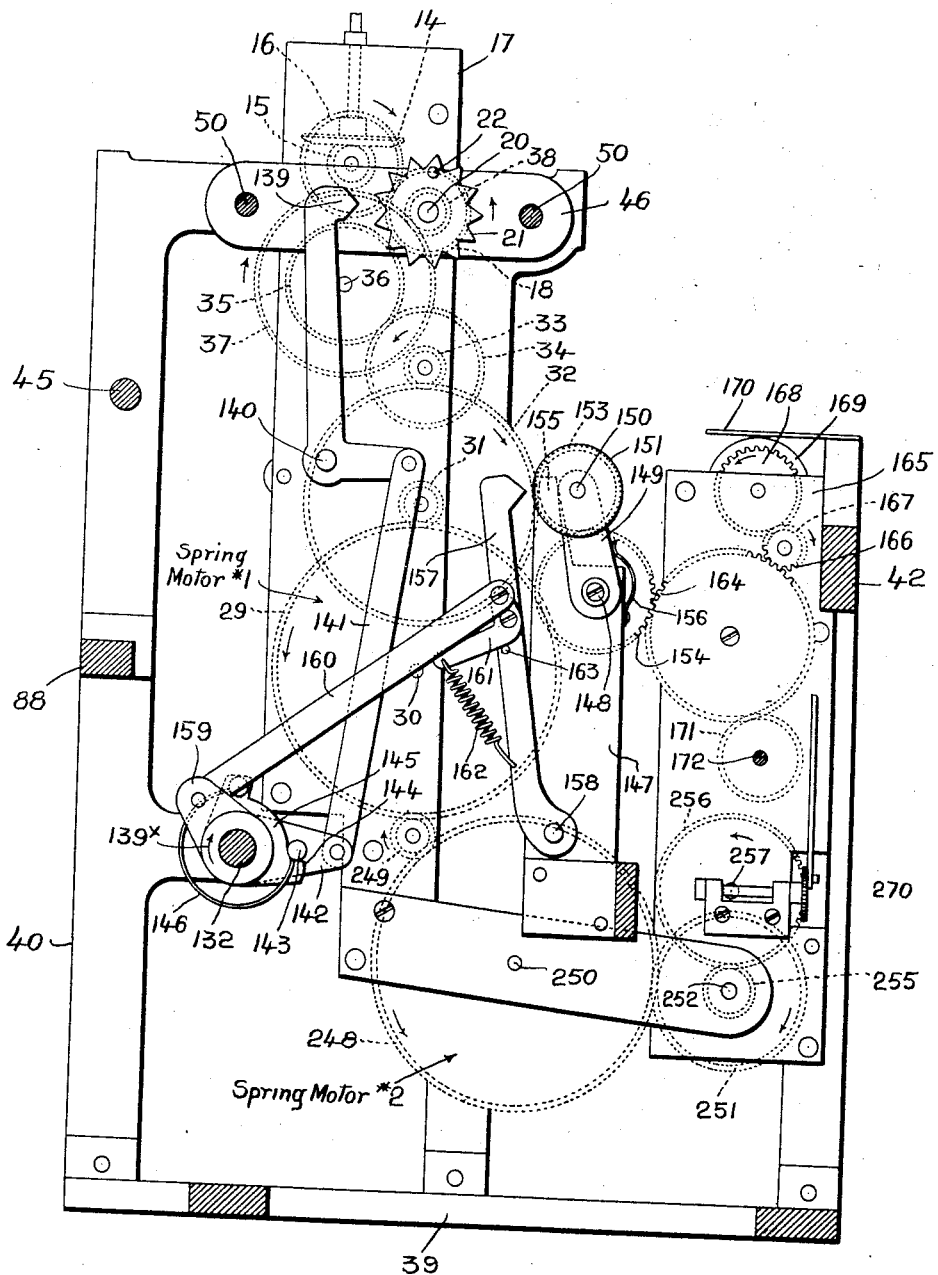

Figure 1 is a front elevation of a recording apparatus embodying my present invention, the inclosing and protective casing for the major portion of the working parts showing the face or dial of the time movement or clock, and said casing is broken out to show the connection between such time movement and other parts of the mechanism; Fig. 2 is a face view of one of the individual cards or checks to be used in connection with the apparatus embodied herein; Fig. 3 is an enlarged detail showing a portion of the front of the frame with the guide or indicator to aid the employee when he makes a selective movement to place the apparatus in readiness to operate, the front of the support for the group of type wheels constituting the recording or printing instrumentality, and a portion of the type-wheels; Fig. 4 is an enlarged front elevation of the mechanism which is located in the lower part of the casing, the greater part of said mechanism being wholly inclosed and concealed by the casing, as shown in Fig. 1, and the greater part of the recording instrumentality is omitted to avoid confusion; Fig. 5 is a top plan view of the mechanism illustrated in Fig. 4 but with the entire recording instrumentality, i. e., the sets of type-wheels, omitted; Fig. 6 is a left-hand side elevation of the mechanism, shown in Figs. 4 and 5, and the recording instrumentality is indicated by a circle, as details thereof are shown in other figures. Fig. 7 is a vertical sectional detail on the line 7—7, Fig. 5, looking toward the right, showing the locking means for the recording instrumentality and a portion of the mechanism for impressing upon the card a daily check mark or indication; Fig. 8 is a right hand side elevation of the platen-operating mechanism and the means for moving the active type-wheels into printing position; Fig. 9 is a detail of a portion of the platen-operating mechanism in position just about to release the hammer; Fig. 10 is a side elevation, partly broken out, of one of the hour and minute "out" type-wheel sets, arranged in juxtaposition to the card receiver or guide, and showing a part of the actuating means for moving the selected set of printing members up to the printing point; Fig. 11 is a similar view of the set of printing members for the "in" records, either morning or noon, as these sets are alike; Fig. 12 is a detail of a portion of one of the hour wheels or members, to be referred to; Fig. 13 is a sectional detail on the line 13—13, Fig. 4, looking to the right, of a part of the means for adjusting or setting by hand the automatic mechanism which changes periodically the position of the controlling member of the day to day positioning means for the card; Fig. 14 is a detail on the line 14—14, Fig. 4, looking toward the left, of a let-off forming part of the mechanism which shifts automatically the stop preventing morning records in the afternoon, and vice versa; Fig. 15 is a sectional detail at the left of line 15—15, Fig. 4, of the let-off device operated by the time movement or clock, and which controls the spring motor for advancing the hour and minute marking members, and also showing the means by which the change of the hour members at the end of each hour is assisted and accelerated; Fig. 16 is an enlarged front or face view of the several hour marking wheels or members and portions of the coöperating minute marking members, to show the relative position of the type or marking portions at a given time, herein taken as 12.15 p. m. Fig. 17 is a rear elevation of the card guide or receiver and the means for positioning the card vertically therein to correspond to the proper day of the week, the shifting stop for the prevention of false morning and afternoon records being also shown; Fig. 18 is a right-hand side elevation of the parts shown in Fig. 17, and with a portion of the mechanism in section on the line 18—18, Fig. 17; Fig. 19 is a detail in side elevation of the member which must be set manually in proper relation to the controlling member of the day to day positioning means before the apparatus can be operated to make a record, with the means for retracting said manually set member after each record is made. Fig. 20 is a detail of the escapement for the minute marking members; Fig. 21 is a detail, partly in section, of the escapement for the periodically changing day shifting means, and for shifting the safety stop. Fig. 22 is a detail in front elevation of the hand setting or adjusting means shown in Figs. 4 and 13.

The casing 1, Fig. 1 is of suitable size and shape to contain the operative parts of the mechanism and is provided with a suitable time movement or clock with exposed dial and hands, as is common in recording apparatus, the lower part of the casing having an opening 2 flanked by wings 3, by which the employee's card or other check is introduced to the communicating receiver or guide within the casing and in which the card is supported when the record is made thereon.

A horizontal shelf or jog 4 in the casing has a sight opening indicated by dotted lines at 5, to permit an indicator showing the day of the week to be seen from the exterior at any time.

Upon the central portion of the shelf is exposed a metallic head 6 in practice fixedly secured to the main framework of the mechanism, said head having an elongated guideway or slot 7 and above it, upon the top of the head 6 as herein shown, a series of disks or buttons 8 is mounted. These disks or buttons are distinctly marked, as shown in Fig. 5, to clearly indicate to the workman which one he should select for a given period of the day before he operates the apparatus to make a record, and the markings herein shown, beginning at the left, Fig. 5, are as follows:—"Morn in", "Noon out", "Noon in", "Night out", "Extra in", "Extra out", the last two being used for overtime work, and the particular number, notation on, and shape or form of these indices may be varied according to circumstances. Inasmuch as working days are almost universally divided into morning and afternoon hours, and inasmuch as the apparatus herein described records the actual amount of time lost, when such a record is proper, it will be manifest that the indices before mentioned, including those for overtime, cover substantially all practical cases.

Beneath each index 8 the head has an opening 9, said openings being arranged in a curved line below and parallel to the slot 7, and a series of larger, corresponding openings 10 is made in the front of the casing below the shelf 4, Fig. 1, for a purpose to be disclosed hereafter.

The record card or check to be used is shown in Fig. 2, it having at its upper end a suitable heading for the name or number of the employee, and a date line, and at the lower end the card is provided with blank spaces for the summation of full, lost, net and overtime, and for totals as to wages and hours, to assist in the collation of the records marked upon the body of the card. The body of the card is divided by horizontal lines to present a series of transverse spaces corresponding to the days of the week, and if desired the abbreviation of each day may be printed at the end of each space reading downward, as M. T. W., etc., though this is a matter of choice. By means of vertical rulings the body of the card is divided into a series of vertical columns, the one at the left being headed "Day" while the headings of the succeeding columns correspond to the indices on the head 6, beginning "Morn in", the record face of the card, however, being turned away from the employee when he inserts it in the opening 2.

As will appear hereinafter the time records of each employee for a given day are impressed or printed in the horizontal space on the card corresponding to such day, and the particular period of the day in which a record is made is determined by a selective movement of a portion of the apparatus by the employee, as will be explained. The relative position of the card and the recording instrumentality vertically, for the change from day to day, is determined automatically by the positioning of a controlling member, but the actual change in the position of the card is effected when an employee positions properly a device coöperating with the controlling member, and if such device is not so positioned no record whatever can be made.

The arbor of the minute hand of the time movement has a pinion 11 meshing with a pinion 12 on a flexible shaft 13, Fig. 1, attached at its lower end to the shaft of and driving a gear 14 which meshes with a pinion 15 fast on a gear 16, Figs. 4, 5 and 15, on a horizontal spindle rotatably mounted on parallel plates 17 secured to the main framework. Said gear 16 drives a gear 18 having an attached pinion 19 and rotatable on a short shaft 20, rotatably mounted in the plate 17 and carrying at its inner end a ratchet 21 provided with an eccentric coupling pin 22, while an escapement wheel 23 is fixedly attached to the outer one of the plates 17 concentric with shaft 20. A pawl-carrier 24 fixed on said shaft between the escapement wheel 23 and the pinion 19 carries a let-off pawl 25, its pivot 26, Fig. 20, having also fast on it a toothed segment 27 meshing with the pinion 19, the pawl coöperating with the wheel 23, a leaf-spring 28 on the pawl-carrier acting upon the segment to normally hold the pawl in engagement with the escapement wheel, as in Fig. 20.

When the time movement advances the pinion 19 in the direction of the arrow, Fig. 20, the segment and pawl are rocked on the pivot 26 to throw the pawl out of engagement with a tooth of the wheel 23, and the shaft 20 and pawl-carrier 24 advance one tooth, the shaft being driven by a spring motor, as will be described. The advance is limited to a single tooth because when released the shaft turns faster than the pinion 19, and as a result the segment 27 is swung back to the relative position shown in Fig. 20, bringing the pawl 25 into engagement with the next tooth of the wheel 23, the teeth of the segment rolling over the relatively stationary pinion 19, the spring 28 assisting the movement. This let-off or releasing device is operated by the time movement, with but very little effort, and serves to permit a spring motor to actuate intermittingly other portions of the apparatus, so that the heavy work is effected by the motor but controlled by the time movement.

Referring to Fig. 7 the large double circle 29 indicated by dotted lines represents a typical clock-spring motor, wound up by a suitable key applied to the outer end of the spindle 30, the master gear of the motor driving a pinion 31 and attached gear 32, the latter actuating pinion 33 and small gear 34 in mesh with a gear 35 fast on a spindle 36. Said spindle has fast on it a gear 37 which meshes with a pinion 38 fast on the shaft 20, the train of gears intermediate the motor 29 and the said shaft operating the latter with the requisite power and at the desired speed whenever the time-controlled let-off device permits, the upper portion of the train of gears being shown in Fig. 4.

The intermittent rotation of the shaft 20 is employed to effect the advance of the several minute marking members or type wheels of the plurality of groups or sets of marking members which in the present invention constitute the printing or recording instrumentality. Before describing this instrumentality it may be stated that the main supporting frame-work for the operative parts of the apparatus comprises a base plate 39, right and left hand skeleton sides 40, 41, and a heavy cross-brace 42 at the front, all firmly and rigidly connected, the head 6 being mounted on the posts 43 and 44 erected on the cross-brace, a tie-rod 45 connecting the sides at the back of the frame, near the top thereof.

The inner one of the plates 17 sustains a horizontal extension 46 having bosses 47 opposite horizontal rods 48 fixedly mounted in the frame side 41, said rods at their inner end carrying coupling sleeves 49, see Fig. 5, and a suspender-bar 50 is mounted in each sleeve 49 and the opposite boss 47, and secured in place by suitable set-screws, as shown, the sleeves being fixed on the rods 48 by set-screws 51.

The front suspender-bar is shown in Fig. 4 partly broken out at its threaded portion 52, while in Fig. 5 the extremities of both bars are shown, the bars being rigidly connected by tie-plates 53, Fig. 3, six being herein shown, spaced apart by collars 54 and clamped on the suspender-bars by suitable nuts 55. By loosening the sleeves 49 and the several set-screws the rigidly-connected suspender-bars and everything suspended therefrom, viz: the printing or recording instrumentality, can be removed bodily without disturbing the rest of the apparatus, a great convenience when any changes, corrections or repairs have to be made to said instrumentality.

The tie-plates support a transmitting shaft 56, see dotted lines Fig. 5, having fast upon it a series of six like gears 57, and a radially slotted arm 58 to receive the coupling pin 22 on the ratchet 21 previously referred to, whereby the shafts 20 and 56 are detachably coupled to be rotated together, the coupling enabling the printing instrumentality to be readily disconnected from the motor train when necessary. Each of the six gears 57 meshes with and drives a large gear 59 attached to one of the minute type-wheels or printing members 60 of each printing device or set, it being understood that herein there is one of such printing sets corresponding to each of the indexes 8.

The minute-marking members or wheels 60 are all alike and each has on its periphery a series of number-types, the numbers running from 1 to 59 inclusive, and instead of zero, said members being rotated in unison, and intermittingly, from the shaft 20 through the transmitter shaft 56 and the gearing, at minute intervals, the connections between the time movement and the releasing device or let-off for shaft 20 being arranged to let off the latter at the end of each minute, the gears 57, 59 advancing the members 60 one peripheral number at each step. Each minute-marking member 60 drives an hour-marking member, the latter being advanced a certain amount at the end of each hour, or in other words each advance of an hour-marking member is effected upon each complete revolution of its minute-marking member.

The printing sets are mounted on swinging-carriers 61 fulcrumed on the tie-plates 53 and depending therefrom, each carrier having a rearward extension 62 provided with cam faces 63, 64, Figs. 10 and 11, the faces 64 being normally held against the tie-rod 45 by springs 65, and when the printing sets are in such normal position the printing faces thereof are inoperative. To cause any set to make a record it must be moved forward bodily into printing position, by actuating means to be described and common to all the printing sets, but coöperating with one only at a time, determined by a selective movement of a part of the apparatus under the control of the employee.

Referring to Fig. 16 it will be seen that while the numbers on the minute-marking members 60 are the same said members are not set alike, angularly, the order being reversed on the second and fourth of such members, from the right, which belong to "noon out" and "night out" printing sets. This is due to the fact that in this apparatus the actual time lost is recorded, as in the Blair patent, the "in" devices recording, at the instant the record is made, the time which has elapsed between the time of recording and the point of time at which an arbitrary character would have been printed, while the "out" devices print the total time from the instant of printing up to the time of termination of the morning or afternoon hours of labor. As before stated, this does not apply to the "extra" or overtime printing devices, as they record actual time, the hour-marking members E and E', Fig. 16, having two series of numbers thereon from 1 to 12 each, one series being distinguished by an underlying dash, or otherwise, these members or wheels making one complete revolution every twenty-four hours, and being driven from their corresponding minute-marking members as will be explained. It will be remembered that full time is herein indicated by an arbitrary character, for instance #, and nothing else, by the same printing members which record lost time.

Now consider the "noon out" set (in which the numbers on both hour and minute members are constantly decreasing) at 10.58 a. m. If a record is then made it will be 1.02, the time lost, at 10.59 the record will be 1.01, at 11.00 the record will be 1—, the dash being used instead of 00, and at 11.01 the record will be —59, that is 59 minutes lost. The hour member thus changes and must change at 11.01 and it cannot change at 11.00, hence at 11.58 we will get a record of —2; at 11.59 we get —1, and at 12 we get — —, so that the desired arbitrary character # will not be made till 12.01. This is a rather serious objection, inasmuch as a large number of full time records would naturally be made between 12.00 and 12.01 and I have provided means herein to overcome it. To this end I make the "out" wheels N and N', Fig. 16, for noon and night respectively, the same size as the "extra" wheels E and E' and operate them from their minute wheels 60 in the same way, but the numbers thereon are duplicated, except the —, and the hour wheels are given a double advance movement, by changing twice on consecutive minutes, between 59 and —, and between — and 1.

Considering the "noon out" set, for example, the apparatus will print with the lowermost 1 (on member N) lost time records ranging from 1.59 (at 10.01 a. m. to and including 1.01 (at 10.59 a. m.). On the change from 10.59 to 11.00 the first advance of member N will bring the uppermost "1" thereon into position, to print 1— at 11 o'clock, if a record be made, and on change to 11.01 the second advance of member N will be effected, so that at 11.01 the "noon out" set will print —59, the result being the same as heretofore, and will continue in regular order until 11.59 when the record will be —1. Inasmuch, however, as the — is not duplicated on member N the first advance of said member between 11.59 and 12.00 noon the — will change to #, and the second advance between 12.00 and 12.01 positions the second #. Thereby I have the arbitrary character in position to print from 12.00 to 12.59, as desired, and with very little extra mechanism, as will appear, the same reasoning and operation applying to the "night out" set of printing members. The foregoing is based upon the assumption that quitting time is 12.00 noon, but the conditions and the arrangement would of course be the same for any other quitting time, as 12.15, 12.30, 4.45, etc. Manifestly a similar correction could be made for the "in" records if desired, so as to print the #, instead of — — between 7.00 and 7.01, but as the employees getting such records are late as a matter of fact, though less than one full minute, there is no object in making the correction, for a record between 7.00 and 7.01 is not strictly entitled to the #, while a record between 12.00 and 12.01 is absolutely entitled to have such character.

The numbers run from 1 to 7, as that suffices for any morning or afternoon period, and the space between the two ends of the series is filled in by a blank $n^x$, which is higher than the number types and makes a smudge only on the card if the "out" printing set is operated after the characters # have been advanced beyond the printing point. The characters #, also, are slightly higher than any of the other type on the wheels N, N' to prevent the type on the corresponding minute wheels from making any impression whatever when "full time" records are made.

The advance of the hour members by their corresponding minute members will now be described, and referring to Fig. 10 the minute member 60 is provided with two tappets 66, so positioned and located that they will one after another engage two successive teeth of a star-wheel 67 fast on a gear 68 rotatably mounted on an extension of the carrier 61, said gear meshing with a larger gear 69 fast on the hour-marking member N or N', as the case may be. On each revolution of the wheel or member 60 the tappets 66 will thus cause two successive advances or steps of the hour member, to bring the two arbitrary characters # successively into printing position at the proper time to make the desired clean record, as described, the gears 68, 69 providing for the required angular movement of the hour member at each advance, remembering that the members N, N' make one complete revolution every twelve hours, or twice in each complete daily period of twenty-four hours. Any desired means may be used for preventing over-running of the members N, N' and to hold them in proper position for making a record, and herein I have shown a spring-controlled detent 70 coöperating with the star-wheel 67 and pivoted at 71 on the carrier 61, the detent at its rear end being bent down and provided with a beveled tooth 72, Fig. 10, which travels upon an annulus 73 affixed to the minute member 60, a double notch 74 being made in the annulus at such a point that when the tappets 66 impart the two successive advances to the hour member the tooth 72 will dip into the double notch and thereby cause the detent 70 to release two teeth of the star-wheel. The annulus thus locks the detent in engagement with the star-wheel until the hourly change is to be effected, and effects the relocking immediately thereafter. Now, inasmuch as the "extra" hour members or wheels E and E' have two sets of numbers 1 to 12, and make one complete revolution every twenty-four hours the said members are advanced hourly by means similar to the construction shown in Fig. 10, except that there is but one tappet, and one releasing notch in the locking ring or annulus which controls the detent.

The "morning in" and "noon in" hour members $M^{\times}$ and $N^{\times}$, Figs 16, are relatively small, as each must be provided with a relatively small series of numbers, and furthermore each one is in operation for only a portion of each day's working hours, and said members have each the full time character # and the —, in addition to the blank type-face $m^{\times}$, the latter and the character # being higher than the rest of the type, for reasons previously given.

Referring to Fig. 11 the said hour members are rotatably mounted, each on a part 75 of the carrier 61 of that printing set, and a star-wheel 76 is secured to the hour member, a spring-controlled detent 77 normally coöperating with the star-wheel to lock it from rotation. The detent is fulcrumed on the carrier at 78 and has connected with it a beveled tooth 79 coöperating with the locking ring 80 rotatable with the minute member 60 and notched at 81, a tappet 82 being so positioned relative to the notch that when the tappet engages the star-wheel and advances it one step, at the end of each hour, the tooth 79 will move into the notch and thereby permit the detent to momentarily release the star-wheel.

The minute members of the several printing sets are intermittingly advanced in unison through the shafts 20 and 56 at each release of the motor, as described, and each hour member is intermittingly advanced by its own coöperating minute member, so when the hourly changes occur a little extra work is placed upon the motor and the shafts 20 and 56, and in order to prevent any sluggish operation at such changes I provide an accelerator, best shown in Fig. 15, as a cam 83 on the shaft 36 and coöperating with a swinging follower 84 held against the cam by a firm spring 85.

The rotation of the cam up to its high point 86 acts through the follower 84 to gradually stretch the spring 85, and the high point passes the follower as the hour change is to be made. The cam is so arranged that thereupon, for a period of about four minutes, the spring 85 acts through the follower and the cam to put pressure on the shaft 36 and turn it forward, assisting the motor spring in its action upon the recording instrumentality at what may be termed the "peak" of the load, this assistance being effective because the devices referred to are so near the escapement end of the train of gearing. Whenever the swinging carrier sustaining any one of the printing sets is moved forward the printing members of that set will be brought into position to make a record.

A horizontal rack 87 is slidably mounted on a tie-bar 88 between the frame sides 41 and 40 at the back of the apparatus, and held in place by an overhanging guide 89, Figs. 4 and 5. Said rack meshes with a pinion 90 fast on the upper end of a shaft 91 having bearings on the frame at 92 and 93, Fig. 6, the lower end of the shaft having an attached beveled pinion 94 in mesh with a beveled gear 95 fast on a horizontal shaft 96 having suitable supporting bearings on the base plate 39. The rack carries an upright standard 97, see Fig. 10, on which is horizontally pivoted a transmitting block 98, held against a rocker bar 99 by means of a light spring 100, said rocker bar extending across the frame and being supported on bell cranks 101, 102, fulcrumed on the frame sides 41 and 40 respectively. The block 98 is movable longitudinally along the rocker-bar and between the latter and the cam faces 63 of the several swinging carriers which suspend the printing sets, the movement of the rack in one or the other direction serving to interpose the block between the rocker-bar 99 and some particular one of the cam faces 63, so that if the rocker-bar is swung forward, it will act through the block to swing that particular printing set forward into position to make a record.

The longitudinal movement of the rack is effected by the employee by mechanism now to be described. The base plate 39 has ears 103 see Figs. 6 and 18 near its front which form bearings for a sleeve 104, held from longitudinal movement by a collar 105 fixed on the sleeve between the ears, said collar having opposite limiting stops 106 best shown in Fig. 4. The rear end of the collar has fixed to it a gear 107, clearly shown in Fig. 18 which meshes with a pinion 108 on the shaft 96, so that by oscillatory movement of the sleeve the shafts 96 and 91 are rotated and the gear 90 is revolved to shift the rack to the right or left an amount determined by angular movement of the sleeve 105. The latter has pinned to its front end extended beyond the casing the hub 109 of an upturned arm 110 having its upper end bifurcated to present ears 111, Fig. 4, between which is pivoted the actuating handle 112, the fulcrum 113 of the latter being at right angles to the sleeve 104, so that the handle has an angular movement about the sleeve as a fulcrum, and a second angular movement in planes radial to the sleeve. The former of these movements is selective, and such selective movement of the handle about the sleeve as a center serves to position the transmitting block 98 in coöperative relation to one or the other of the printing sets. The handle is preferably provided at its upper end with a knob 114, and a pin 115 is extended rearwardly therefrom, see Fig. 6, and passes loosely through a hole in the depending shank 116 of a plate 117 provided with headed studs 118 which extend into and are slidable in the slot 7. The plate has an overhanging head 119 below which is pivotally mounted a spring-controlled locking lug 120 having a finger-piece 121, said lug being adapted to enter any one of the series of holes 9 in the head 6 to thereby lock the actuating handle in any one of its operative positions. A pointer 122 on the top of the locking plate travels along in front of the index studs 8.

In Fig. 4, the actuating handle has been selectively moved about the sleeve 104 as a center into position opposite the index for "night out," and the locking device for the handle has locked it in such position from which it cannot be moved until an employee purposely withdraws the lug 120 into unlocking position.

The slots 10 on the front of the casing, see Fig. 1, are arranged opposite the path of movement of the pin 115, and correspond in position to the locking openings 9, so that when the handle is locked in any one of its selected positions it can be given a second movement on the fulcrum 113 by pushing in the knob 114. This second movement is the one which makes the record provided a card has been inserted in the card receiver, the selective movement having determined which one of the printing sets of the recording instrumentality is to operate.

Owing to the connections between the actuating handle and the shifting rack, the indices 8 are arranged in reverse order to the printing sets, as will be evident by a comparison of Figs. 5 and 16. That is, the "morning in" index is at the left of the set of indices, while the "morning in" printing set is the right hand one of the six sets. When the actuating handle is moved to the right, the rack 87 is shifted to the left and vice versa. The lower end of the handle is bifurcated to embrace the headed end of a rod 123 longitudinally movable in the sleeve 104 and having its rear end threaded to receive an adjustable collar 124 having ears to which at 125 one end of a link 126 is pivotally connected, the link being extended rearwardly and pivoted at 127, see Fig. 6, to a rocker plate 128 fulcrumed on the base plate at 129.

A short link 130 is pivotally connected at its ends to the rocker plate and to a short rearwardly extended arm 131, fast on an operating rock shaft 132 extended horizontally across the apparatus below the recording instrumentality, and having its bearings in the frame sides 40 and 41. The rocking of this shaft through suitable intervening transmitting devices effects the movement of the selected printing set into recording position; the locking of the printing members of such set so that there can be no rotative movement thereof during the making of the record; the movement of the platen to press the card toward the type and the effectuation of the hammer blow to make the impression as will be described, and also to actuate an independent printing device which prints on the card a letter, word or other character corresponding to the particular day of the week on which the record is made.

Each of the bell-cranks 101, 102, has pivotally connected with it a depending and preferably adjustable link 133, very clearly shown in Fig. 8, the lower ends of the links being deeply notched or hooked to embrace the actuating rock-shaft, and below said shaft each link is provided with an inwardly extended and lateral stud 134 which coöperates with a cam 135 fast on the shaft.

Springs 136 connecting the bell-cranks and the tie-rod 45 serve to maintain the parts normally in the position shown in Fig. 8, and a strong spring 137 attached at one end to the base-plate 39, and at its other end to a rearwardly extended arm 138 on the main shaft, tends to maintain it in the position shown.

When the actuating handle is swung inward on its fulcrum 113, the described connections between said handle and the shaft 132 turn the latter in the direction of the arrow 139$^x$, Fig. 8, thereby swinging the cams 135 downward and rearward to depress the studs 134 and hence the links 133 act through the bell cranks 101, 102, and move the rocker bar 99 forward to operatively position the selected printing set. When the full forward movement of the bar 99 has been effected the lower ends of the cams 135 then engage the studs 134, said lower ends being made as circular arcs, so that any continued rotative movement of the main actuating shaft 132 will not have any additional depressing action on the links. The spring 137 returns the shaft 132 to normal position, and also operates to return the actuating handle to its normal position, best shown in Fig. 6.

When the selected printing set has been operatively positioned it is necessary that the hour and minute marking members thereof be locked from any angular movement when the record is being made, in order that a clear and sharp impression be marked, stamped or otherwise impressed upon the card. To this end a pawl 139, fulcrumed at 140, is arranged to coöperate with the ratchet 21, Fig. 7, when the handle 112 is moved to make a record, the ratchet being thereby locked from rotation and acting through the transmitting shaft 56 and the intermediate gears to lock and aline simultaneously at their respective printing points, all of the minute marking members 60, the latter in turn locking their respective hour marking members.

The foot of the pawl is offset and pivotally connected with a link 141 which at its lower end is jointed to an arm 142 mounted loosely on the shaft 132 and having a lug 143 normally resting on a shoulder 144 formed on a segmental plate 145 fixed on shaft 132, a bow-spring 146 fast at one end on said plate and at its other end connected with the lug 143 holding the latter against the shoulder in the position shown in Fig. 7, with the pawl 139 inoperative.

When the operating shaft 132 is turned in the direction of arrow 139$^x$ the spring 146 causes the lug to follow the shoulder 144 and thereby the pawl is swung forward into engagement with the ratchet, locking the printing sets from angular movement; the spring yielding as the rotative movement of shaft 132 is continued and completed. At the same time an entirely independent auxiliary printing device is moved to printing position and locked, said device being designed to make upon the card a "day" record every time one of the main printing sets is operated.

Upon a part 147 of the framework I fulcrum at 148, Fig. 7, an upturned arm 149 having a bearing for a shaft 150 on which is fixed a type-wheel 151 having on its periphery the letters "M", "T", "W", etc., indicating the days of the week, and so located that said wheel will print one of the "day" letters or characters in the vertical column headed "Day" on the card, see Fig. 2. Said shaft 150 has fast on it a ratchet 152, Fig. 5, and a gear 153 meshing with a gear 154 coaxial with the fulcrum 148, so that said gears properly mesh at all times, the wheel 151 being changed or shifted automatically by a periodically changing mechanism, to be referred to hereinafter, the shaft bearing on the carrier or arm 149 being held normally against a stop 155 by a suitable spring 156, Fig. 7.

A combined locking and positioning pawl 157, fulcrumed at 158, is arranged to be swung forward into engagement with the ratchet 152 to lock it and the printing wheel 151 from rotation and then to move said wheel forward against the ink-ribbon to mark the card.

A short rocker-arm 159 fast on the shaft 132 has pivoted to it a link or bar 160 connected with a bell-crank 161 pivotally mounted on pawl 157 and held by a spring 162 against a stop 163, Fig. 7, the spring being strong enough to cause the full forward swing of the pawl when the main operating shaft is turned, but yielding when the wheel 151 reaches its extreme forward position, and thereafter the shaft movement is completed.

The gear 154 meshes with a large gear 164 rotatably mounted on the inner one of two parallel upright plates 165 fixedly secured to the frame side 40, said gear driving a pinion 166 having rotatable with it a small gear 167 in mesh with the gear 158 fast on the shaft of an indicator drum 169, on the surface of which the names of the days of the week are printed, visible through the sight-opening 5, Fig. 1, and also Fig. 5, said opening being made in the plate 170 which lies flush with the shelf or jog 4 of the casing.

Whatever day is shown by the indicator drum the corresponding initial or other mark will be so positioned on the printing wheel 151 as to print on the card when the apparatus is actuated by an employee, the visual indicator acting as a check for the benefit of the employee as he can always compare it with the record made on his card, and thus make sure that the apparatus is properly set for the day.

Before describing the mechanism for effecting automatically the daily change I will describe means whereby the day shifting or changing may be effected manually, to set the apparatus in a convenient manner. The gear 164 meshes with a pinion 171 fast on a horizontal shaft 172 rotatably mounted in the plates 165, a disk 173 being fixedly mounted on the shaft adjacent a star or escapement wheel 174, Figs. 4, 13 and 22, loose on said shaft, said wheel having in practice a circular series of holes corresponding in number and arrangement to a series of laterally extended pins 175 carried by the disk 173, the ends of the pins being shown in Fig. 13. Seven pins are shown, but one, as 176, is longitudinally movable through the disk 173 into and out of any one of the seven holes of the escapement wheel 174, the pin 176 being eccentrically and fixedly mounted on a grooved collar 177 slidable on shaft 172 and pressed against the disk 173 by a spring 178, Figs. 4 and 22, the said disk and the pins forming a species of ratchet. When the spring is expanded, as it is normally, the movable pin 176 locks together the ratchet disk 173 and the escapement wheel 174 so that the latter revolves the shaft, but when the collar 177 is moved to the left, Figs. 4 and 22, the said pin will be withdrawn from the escapement wheel, so that the shaft and other parts may revolve independently of said wheel.

A short rock-shaft 179 mounted in the frame side 40 and extended through the adjacent plate 165 has on its outer end a crank-handle 180, Fig. 4, and inside the plate 165 an arm 181 is fixed on the rock-shaft, carrying a spring-controlled pawl 182 adapted to engage a pin of the disk 173 and advance the latter one-seventh of a revolution for each operation of the handle 180. Before this manual actuation of the day shifting means is effected the pin-disk must be unlocked from the star wheel, and this is effected by a finger 183 coöperating with the collar 177 and mounted on a laterally swinging arm 184 fulcrumed at 185, Fig. 13, and bearing against a side cam 186 on the rock-shaft 179. When the latter is turned from right to left, Fig. 13, the cam first acts upon arm 184 to swing it and the collar 177 to the left, Fig. 4, compressing spring 178 and withdrawing the pin 176 from the escapement wheel 174, and as said pin releases the wheel the pawl 182 engages one of the pins of the pin disk 173 and gives the shaft 172 one-seventh of a revolution. After each of such movements of the shaft the spring 178 returns it and the other parts to normal position, so that by the proper number of successive operations of the handle 180 the day wheel 151 will be shifted to bring the proper letter thereon into operative position, and the corresponding day of the week will appear on the indicator, at the opening 5.

The shaft 172 is extended inward and near the center of the main frame has fast on it a bevel gear 187 which meshes with a like gear 188, Figs. 17, 18 and 19, loose on a shaft 189 at right angles to shaft 172 and extended frontward through a bearing on a plate 190 rigidly secured to and depending from the cross-brace 42. The hub of the gear 188 extends loosely through the bearing 191, see Fig. 19, and has fixed upon its front end a controlling member, shown as a disk 192, between the bearing and a supporting bracket 193, through which the shaft 189 extends, said disk having a radial notch 194 and a hole 195 adjacent the notch and between it and the shaft.

The plate 190 has a circularly arranged series of seven openings 196, shown in dotted lines, Fig. 4, around the shaft 189 and so placed that the hole 195 in the controlling member 192 may register accurately with any one of them.

The partial revolution of shaft 172 at the end of each daily period acts through the gears 187 and 188 to advance the member 192 a like amount, i. e., one-seventh of a full revolution, so that the hole 195 is moved into position opposite one after another of the apertures 196.

A lateral arm 197 fast on the outer end of shaft 189 carries a rearwardly extended stop pin 198 movable in a circular path having the shaft as a center and with such radius that the pin can pass through the hole 195 in the controlling member 192 and through one of the apertures 196 whenever the hole 195 is in register therewith. Said arm preferably has its end beveled, as shown in Fig. 4, to serve as a pointer and assist the employee in positioning the stop pin, for when the pointer-like arm 197 is centered with relation to the notch 194 then the stop-pin 198 will be opposite the hole 195 in the controlling member 192, and the shaft 189 and parts connected therewith can be pushed inward, to the left Fig. 6, the pin 198 passing through the hole 195 and the registering aperture 196. At no other time can such longitudinal movement of the shaft be effected, hence it will be seen that the angular position of the controlling member 192 determines the position which the arm 197 must have before the shaft can be moved, for otherwise the pin 198 will engage the face of member 192 and stop longitudinal movement of the shaft. The angular movement of the latter to properly position the stop pin 198 is effected manually, and by the first employee who uses the apparatus on a given day, the arm 197 being outside the casing, as shown in Fig. 1.

A segmental extension 199 is formed on the actuating handle 112, so located that some part of it will be opposite the outer end of shaft 189 in any one of the various selective positions of the handle corresponding to the indices 8, so that the handle cannot be pushed inward about the pivot 113 unless the stop-pin 198 is opposite the hole 195 in the controlling member 192. The latter is shown in Fig. 1 as positioned for a certain day of the week, say Monday, and the arm 197 is supposed to have been manually moved into proper relation thereto, so that at any time that day the actuating handle may be moved to make a record while such relation continues, irrespective of the selective position of such handle. Consequently, all records will be "Monday" records, and no others, and at midnight the controlling member 192 will be advanced automatically one step, by the periodically changing means, not yet described, so that the next morning the first employee to register must turn the arm 197 forward to bring the pin 198 into proper position, and so on for each succeeding day of the week, as a condition precedent to registering, for if the handle cannot be moved inward the apparatus cannot be operated to make any record.

The "day" printing member 151 is changed or advanced simultaneously with the change of the controlling member 192, and by the same motive mechanism, as will appear.

Shaft 189 has fast on it a collar 200, Fig. 19, engaged by a forked and pivotally mounted arm 201 controlled by a strong spring 202 which normally acts to maintain the shaft 189 and the actuating handle 112 in their outward positions, Figs. 6 and 18, the movement of the handle to make a record acting against the spring.

The positioning of the card in the card receiver for the day of the week on which a record is made is governed and effected by the manual angular movement of the shaft 189, so that if the stop pin 198 is properly positioned with relation to the controlling member 192 a card, when inserted in the receiver, will be properly positioned for the current day.

A long pinion 203 fast on the inner end of shaft 189 meshes with a vertically movable, longitudinally slotted rack bar 204, Fig. 17; held slidably in place on headed studs 205 mounted on a plate 206 behind the plate 190 and carried thereby, the rack having rigidly attached to it a cross-head 207, shown centrally broken out in Fig. 17, and with its ends slidable in fixed vertical guideways 208 which form the sides of the card-receiver or guide.

A ratchet plate 209 is secured to one side of the rack-bar 204 and coöperates with a detent tooth 210 on a swinging carrier 211 controlled by a spring 212, see dotted lines Fig. 17, a transverse ledge 213 on the crosshead 207 serving as a stop or abutment on which the bottom of the card rests when inserted in the card receiver.

Each angular movement of the shaft 189 operates through the rack-bar and pinion to raise or lower the rack-bar and the crosshead 207, so that thereby the effective depth of the card receiver is correspondingly varied, as the abutment 213 forms a movable bottom for said receiver, and when at its lowest position the abutment causes an inserted card to be positioned with the uppermost horizontal "day" space thereon opposite the printing point of the recording instrumentality. As the successive days of the week arrive the corresponding angular movements manually imparted to the shaft 189 will elevate the abutment to successively higher points, so that the proper "day" spaces on the card will be positioned opposite the printing point.

Each side 208 of the card receiver or guide is rearwardly curved at its upper end, at 214, best seen in Fig. 18, so that when the platen is moved at the time a record is made the card will be bent or bulged, at the printing point, the curvature being opposite to that of the members of the operative printing set, to prevent extra printing and insure a clean record. The open mouth 215 of the card receiver flares, as is usual in apparatus of this character, to facilitate the insertion of the card.

As the abutment 213 is operatively positioned the detent tooth 210 snaps into holding engagement with the rack 209 and maintains the abutment in the set position until positively changed.

The platen 216, Figs. 5 and 6, slides back and forth in fixed bearings 217 erected on the cross-brace 42, and is pivotally connected by short links 218 with a rocker 219 fulcrumed at 220, said platen-rocker having at one end an arm 221, Fig. 5, extended rearwardly and pivotally connected with the upper end of a depending link 222.

Referring now to Fig. 8, the link is connected by a short radius-bar 223 with the stand or bracket 147 on the frame, to guide said link, the foot of the latter resting on the arm 224 of a bell-crank 224, 225, fulcrumed at 226 to an ear on the base-plate 39, a spring 227 serving to yieldingly maintain contact between the link and the bell-crank. An adjustable link 228 connects the bell-crank arm 225 with a segment plate 229 fulcrumed on the base-plate below the main rock-shaft 132, the latter having fast on it an arm 231 connected by link 230 with said segment plate, as clearly shown in Fig. 8. When rock-shaft 132 is turned in direction of arrow 139$^\times$ the link 228 is moved rearwardly, and the bell-crank 224, 225 is rocked into the position shown in Fig. 9, the spring 227 causing link 222 to descend and move the platen 216 against the card, which is thereby bent or bulged as referred to and pushed snugly against the usual ink-ribbon, (not shown,) and the type-wheels of the operative printing set, which wheels have been brought to the printing position by means described. This positioning of the platen by the action of spring 227 takes place while the bell-crank is moving to the position shown in Fig. 9 and places the platen in readiness to make the impression by a hammer-blow.

The tip or point 232 of the bell-crank arm 225 coöperates with a cam-face 233 on a cam-plate 234 pivoted to swing laterally between ears 235 on a hammer 236 fulcrumed horizontally at 237 on a rigid stand or bracket 238, the hammer being adapted to strike a stud 239 on the link 222. On the opposite side of the stand 238 a segmental plate 240 is fulcrumed concentrically with the hammer, and held by a spring 241 against a fixed stop 242 under normal conditions, the edge of the plate being recessed at 243 to receive a lug 244 projecting from the adjacent face of the hammer. When the bell-crank is rocked as described the point 232 coöperates with the cam-face 233 and swings upward the cam-plate 234 and the hammer 236 as a unit, on the pivot 237, the lug 244 at the same time acting upon the plate 240 to raise it and stretch spring 241, all as shown in Fig. 9, while the platen is operatively positioned by spring 227 and intervening connections. When the link 228 has nearly completed its working stroke the point 232 slips down and off the cam-face 233, releasing the hammer, which is brought down by the spring 241 and strikes a sharp, quick blow on the stud 239. This hammer-blow communicated through the link 222 to the platen causes the record upon the card to be printed or stamped with much greater clearness than could be effected by pressure alone. When the hammer is nearly down the segment 240 engages the stop 242 and the hammer finishes the operative stroke alone, so that when some of the parts are returned to normal position the spring 241 will not be stretched again.

The bell-crank arm 225 is beveled at one edge, at 245, and the farther side of the plate 234 is oppositely beveled at 246, so that as the bell-crank comes back to the position shown in Fig. 8 the beveled surfaces 245, 246 wipe over each other, swinging the plate 234 to the right, Fig. 4, so that the point 232 can pass, after which plate 234 resumes its normal position, assisted by a light spring 247, with the cam-face 233 back of the point 232.

The periodically changing means for effecting automatically the daily shift or change of the controlling member 192 will now be described, together with a safety shifting device for morning and afternoon hours. A second clock-spring motor, provided with a master gear 248, see dotted circles Fig. 7, is preferably connected, by a pinion 249, with the master gear 29 of the previously mentioned motor, in order that the two motors will work together, the second motor being wound by the application of a key to the outer end of its spindle 250. The master gear 248 meshes with a gear 251 fast on a spindle 252 rotatably mounted in the plates 165, Fig. 4, said spindle having fast upon it a disk 253 provided with diametrically opposite notches 254, Fig. 14, and a pinion 255 also fast on the spindle meshes with a gear 256 loose on a spindle 257. Said spindle has fixedly mounted upon it a three-toothed gear 258, which coöperates with the star-wheel or escapement 174 to alternately lock and advance it, as will be clear from an inspection of Fig. 13, wherein said escapement is shown as locked. The gear 256 is inserted between the hubs of a gear 259, see Fig. 21, and a seven-toothed ratchet 260, both of which are fixedly secured to the spindle 257, said ratchet having a laterally extended pin 261 extended loosely into a segmental slot 262 in the loose gear 256, one end of a bow-spring 263 being attached to said pin. The other end of the spring is secured to a pin 264 on the gear 256, so that as the gear is rotated in the direction of arrow 265, Fig. 14, the spring will be tightened, as the ratchet 260 is held from rotation by a detent pawl 266 until the toe 267 of said pawl drops into one of the notches 254 of the disk 253. Said pawl is fulcrumed at 268 and a spring 269 acts to withdraw the pawl and thereby release the ratchet each time a notch 254 is moved opposite the toe 267. Now when the ratchet is locked the spring 263 is gradually tightened as the gear 256 advances, but when the toe 267 slips into one of the notches 254 the bow-spring expands quickly and advances the ratchet 260 and the spindle 257 one-seventh of a revolution, the pin 261 traveling in the slot 262, the periphery of the disk 253 acting upon the pawl-toe to again cause the pawl to engage and lock the ratchet.

The train of gearing is so proportioned that the pawl releases the ratchet at midnight and after mid-day, so that there are two advances of the spindle 257 each twenty-four hours, and the three-toothed gear 258 is moved forward by said advances, the one at noon bringing one of the teeth into position to operate the escapement 174 and the midnight advance acting to advance the escapement one step, to thereby effect automatically the daily change or shift in the controlling member 192.

It will be remembered that the rotative movement of shaft 172 not only effects this change, but it also operates to effect automatically the daily change or shift of the printing member 151 and the indicator drum 169, by connections already described.

The gear 259 meshes with a pinion 270 eccentrically connected with a link 271, Fig. 117, jointed at its upper end to one arm of a bell-crank 272 pivoted at 273 on the cross-brace 42, the upturned arm of the bell-crank being pivoted at 274 to one end of a laterally shiftable stop-block 275, suspended at its other end by a link 276 parallel to the upturned arm of the bell-crank. When the pinion 270 is given a half revolution the stop-block 275 will be moved in one direction, and at the next half revolution it will be moved in the opposite direction, said block having reversed notches 277, 278, formed in its upper and lower edges, see Fig. 4, and when positioned as therein shown the notch 277 is below the locking aperture 9 corresponding to the "noon in" index on the head 6. Consequently the actuating handle may be operated, as the pin 115 thereon will pass through the notch 277, or it may be operated for the "night out" or "extra" positions. But the handle cannot be operated for either the "morning in" or "noon out" positions, as it will be seen that solid portions of the stop-block 275 are interposed in the path of pin 115. This positioning of the block is effected after the "noon out" records have been made and prior to the termination of the noon hour, and is not changed until after midnight, when a half-revolution of the pinion 271 is again effected and the block will be moved to the right, Fig. 4, the notch 278 then being under the "noon out" locking aperture 9 and the "morning in" locking aperture will be clear of the left hand end of the stop-block. But solid portions of the block will be interposed in the path of the pin 115 should the handle be moved to the "noon in" or "night out" positions during morning work hours, thereby preventing the actuation of the handle to make a record. Manifestly there can be no afternoon records made during morning work hours, and conversely no morning records can possibly be made in the afternoon, so that false records of this character are absolutely prevented by the safety device just described.

It will be understood that the block itself is concealed by the front of the casing, as shown in Fig. 1, but the shifting of the block leaves an unobstructed passage for the pin 115 through certain of the apertures 10 in the casing, according to the time of day, there being no necessity for said stop-block having any movement to shut off the operation of the "extra" printing sets at any time.

The cross-brace 42 is built up at 279 to form a solid backing for the stop-block, taking up any thrust of the pin 115 if an attempt is made to operate the actuating handle in a selective position which is temporarily shut off or blocked.

An inspection of the card, Fig. 2, will give a clear understanding of the character of the records made, the owner of such card having worked full time every day but Monday and Wednesday, as shown by the arbitrary character # in each of the other spaces, Saturday being the usual half day. On Monday he came in on time, but went out before noon, at 9.23 so that when the "out" record was made it showed the exact time between the going out and the end of the morning work period, to wit: two hours, 37 minutes. On Wednesday he was fifteen minutes late in getting to work, so the "morn in" record shows −15, i. e., no hours, but fifteen minutes lost time. On Monday morning, however, he came back shortly after leaving, and took his "extra in" record at 9.49 the actual time, and recorded his "extra out" time as 12.00 noon, while on Thursday he put in extra time from 6.23 to 9.54 p. m.

The results are shown in the summation at the foot of the card, lost time of 2 hours, 52 minutes being deducted from full time, and the "extra" time of 5 hours, 42 minutes being added, the work of collation being very much simplified and shortened.

It will be remembered that normally the escapement wheel 174 will under normal conditions be connected with the pin-gear 173—175, fast on shaft 172, by the sliding pin 176, so that the intermittent letting off of the motor-driven, periodically changing means effects automatically the daily shift of the controlling member 192 and the "day" marking wheel 151.

As any suitable inking device may be employed, I have shown herein only the ribbon-spools 280, one at each side of the main framework, to sustain a suitable ink-ribbon which in practice extends from one to the other spool between the back of the card receiver and the printing sets of the printing or recording instrumentality, at the impression or printing point, and said spools may be operated in any desired manner, as for instance in my patent before referred to, or otherwise.

The several operations have been described in detail, but a brief description of the operation of the apparatus will be given. The employee about to make a record grasps the actuating handle or actuator by its knob 114 and by a selective movement swings the handle to the right or left, Fig. 4, as may be necessary, bringing it to the index 8 for the proper period of the day, unlocking the handle by lifting the finger 121 until the handle is in the selected position, and again locking the handle by releasing the finger. Now it is necessary to impart a movement in a different direction to the handle to make the record, but before so doing the employee must see to it that the stop-pin 198 is opposite the hole 195 in the controlling member 192, which latter has been set or shifted automatically for the current day of the week. Such positioning is effected by angular movement of the pointer arm 197 into registering position with the notch 194, and as has been explained this movement of said arm operates through shaft 189 and intervening connections to properly position the abutment 213 in the card-receiver for the current day. Having brought the stop-pin into registering position the card is inserted in the card receiver, with its ruled face toward the back of the apparatus, and the handle is pushed inward as far as it will go. The selective movement of the actuating handle has brought the corresponding printing set under the control of the operating movement of the handle, so that when the latter is pushed inward such operating movement causes the selected printing set to be swung forward to printing position and its marking members locked, while simultaneously the platen is moved against the card, and the hammer-blow is made to give the impression as the operating movement of the handle is completed. The record is now made and the released handle is returned automatically to the normal position shown in Fig. 6, the employee removing his card and making way for the next one. With the time record the index letter for the day is impressed upon the card, through the instrumentality provided for the purpose, such instrumentality and the selected printing set returning to inactive and unlocked position when the actuating handle is released. The selective movement of the handle is imparted by the first one who operates the apparatus in any given period of the day, those following imparting only the operating movement until the given period terminates, as will be manifest, or unless an "in" position of the handle must be changed to an "out" position, and vice versa.

Any attempt to make a record for a future day will be detected by the "day index" impressed or printed on the card in the day column and the automatically shifted stop-block obviates the possibility of advanced or retarded records on a given day.

By the term "fixed period of labor" used in the specification and in the claims, I mean a period of time the beginning and termination of which is fixed by the employer, applying to all regular employees, as defining their working hours, and such fixed period of labor will therefore begin at a fixed hour in the morning, or afternoon, and terminate at a fixed hour in the morning, or afternoon, as the case may be. For instance, the morning fixed period of labor may be from 7 o'clock a. m. to 12 o'clock noon, and the afternoon fixed period of labor may be from 1 o'clock p. m. to 6 o'clock p. m.

In the following claims, I have used the term "the time of commencement of a predetermined period of labor" and by such term I mean the time of commencement of a fixed period of labor, which period is the same for all regular employees, and which is fixed and determined entirely independent of the time at which any employee may come to his work. So, too, the term "the time of ending of a predetermined period of labor" means the time of ending of a fixed period of labor, which period is the same for all regular employees.

I have described in detail the different escapements or let-off devices whereby the various instrumentalities actuated by the motor mechanism are given their movements, controlled by a clock or time movement, as such devices are well adapted to effect the desired results, but it will be understood that my invention is not in any way restricted to the precise structures shown and described for such let-off devices, as other suitable forms may be employed. So, too, various changes or modifications may be made by those skilled in the art in other details of construction and arrangement without departing from the spirit and scope of my invention as set forth in the claims appended hereto.

Having fully described my invention, what I claim as new and desire to secure by Letters Patent is:—

1. In a workman's time recorder, in combination, a time movement, a recording instrumentality controlled thereby including a plurality of printing sets each adapted at a given point of time to record by a single impression upon a record-receiving member the elapsed time between said point and the time of commencement of a predetermined fixed period of labor, and means adapted to be operatively connected with any one of the printing sets and thereafter to bring said set into operative relation with the record-receiving member.

2. In a workman's time recorder, in combination, a time movement, a recording instrumentality controlled thereby including a plurality of independently movable printing sets each adapted at a given point of time to record the amount of time between said point and the time of ending of a predetermined fixed period of labor, and means adapted to be operatively connected with any one of the printing sets and thereafter to move said connected set into operative relation with the record-receiving member.

3. In a workman's time recorder, in combination, a plurality of time-controlled printing sets independently movable to printing position and each adapted at a given point of time to record by a single impression upon a record-receiving member the elapsed time between said point and the time of commencement of a predetermined fixed period of labor irrespective of any previous operation of the apparatus, an actuator, and means to temporarily connect it with any one of the printing sets and effect movement thereof into operative position with relation to the record-receiving member.

4. In a workman's time recorder, in combination, a plurality of time-controlled printing sets independently movable to printing position and each adapted at a given point of time to record the amount of time between said point and the time of ending of a predetermined period of labor, an actuator, and means to temporarily connect it with any one of the printing sets and effect movement thereof into operative position with relation to the record-receiving member.

5. The combination, with a time movement, of a recording instrumentality comprehending a plurality of printing sets, a supporting frame, depending carriers fulcrumed thereon to sustain the printing sets, each of the latter including hour and minute marking members, a transmitting shaft carried by the frame and operatively and permanently connected with all of the minute marking members, a driving shaft controlled by the time movement, and a detachable coupling between said driving and transmitting shafts whereby the recording instrumentality and the transmitting shaft connected therewith may be disconnected from the driving means and removed bodily as a unit.

6. The combination, with a plurality of record-printing sets arranged side by side, a fixed support, and swinging carriers depending therefrom and each sustaining a printing set, of a motor operatively connected with and to drive all of the sets irrespective of their angular position with relation to said support, a time movement controlling said motor, a platen, and manually operated means to select and move any printing set into operative position with relation to a record-receiving member interposed between it and the platen, and to thereafter move the platen to cause an impression to be made upon said member.

7. The combination, with a plurality of independently movable time stamps arranged side by side and normally in inactive position, of a receiver or guide for a record-receiving member, and means, including a handle manually movable into operative connection with any one of the time stamps and to move the selected stamp into active position to make a record on the record-receiving member.

8. The combination, with a plurality of independently movable time stamps arranged side by side and normally in inactive position, of a platen, a receiver or guide for a record-receiving member, located between the platen and time stamps, means to select and move any one of the stamps into active position relative to the record-receiving member, and means to move the platen against such member and to transmit thereafter thereto a hammer blow, to cause the actively positioned time stamp to make a record.

9. The combination, with a plurality of independently movable time stamps arranged side by side and normally in inactive position, of a platen, a receiver or guide for a record-receiving member, located between the platen and time stamps, manually operated means to first select and then move into active position any one of the time stamps, means to move the platen against the record-receiving member, and means to thereafter cause the platen to transmit a hammer-blow to the back of the record-receiving member and cause the actively positioned stamp to make a record upon the face of said member.

10. In a time recorder, the combination with a plurality of sets of marking members or wheels normally in non-recording position, of a support for and with which said sets are connected to be bodily movable independently of each other, time controlled means to drive continuously all of the sets, irrespective of their angular position with relation to said support, and a detachable coupling intermediate said means, and the sets of marking members whereby the latter may be removed as a unit from said means.

11. In a time recorder, in combination, a main frame, time-controlled driving means carried thereby, a plurality of sets of marking members, a support for and with which said sets are independently connected and movable relatively to each other, separable connections between the main frame and the support whereby the latter and the sets of marking members connected therewith can be removed bodily from the main frame, and a detachable coupling between the sets of marking members and the driving means.

12. In a time recorder, in combination, a main frame, a card guide or receiver mounted thereon, a plurality of sets of marking members each adapted to make a record upon a card in said guide or receiver, a support upon which the sets are mounted, and adjustable connections between the support and the main frame whereby said support may be laterally adjusted to properly locate the sets of marking members with relation to the card receiver or guide.

13. In a time recorder, in combination, a plurality of sets of time recording members each including a minute wheel, a transmitting shaft operatively connected with each minute wheel, and means to support each set to swing about the transmitting shaft as an axis.

14. In a time recorder, in combination, a plurality of sets of time stamps, a shaft operatively connected with and to drive each set, and means to support the sets to swing about said shaft as a center.

15. In a time recorder the combination, with a plurality of sets of hour and minute marking members, of a shaft operatively connected with and to drive each minute marking member, and a series of carriers fulcrumed coaxially with and depending below said shaft, each set of marking members being sustained by a carrier.

16. In a time recorder, the combination, with a plurality of sets of hour and minute marking members, of a shaft operatively connected with and to drive each minute marking member, a carrier for each set, fulcrumed to swing about the shaft as a center, motor driven mechanism, a time-controlled escapement to permit intermittent operation of said mechanism, and a coupling intermediate the latter and the said shaft.

17. In a time recorder, a plurality of independently and bodily movable printing sets each including a minute marking wheel, time-controlled mechanism to advance said wheels simultaneously and intermittingly, an actuator to coöperate with any one of said printing sets and operatively position it with relation to a record-receiving member, and means to aline simultaneously all of the minute wheels at their respective printing points by operation of said actuator.

18. In a time recorder, a plurality of pairs of hour and minute marking wheels, time-controlled driving mechanism, including a shaft having a ratchet fast upon it, and an escapement to rotate the shaft intermittingly, a common transmitting member intermediate said shaft and the minute wheels, manually operated means to bring any pair of wheels to active position, and a pawl automatically moved into engagement with and to lock the ratchet by the manual operation of said means.

19. In a time recorder, a plurality of devices each adapted to make a record upon a record-receiving member, a motor mechanism, a shaft positively rotated thereby, a fixed escapement wheel coaxial with the shaft, a pawl-carrier fast on the shaft and provided with a pawl to coöperate with said wheel and stop rotation of the shaft, clock-controlled means to intermittingly disengage the pawl from the escapement wheel and permit the shaft and pawl-carrier to advance one step by the action of the motor mechanism, and means to transmit the intermittent rotation of the shaft to the record-making devices.

20. In a time recorder, a plurality of devices each adapted to make a record upon a record-receiving member, a motor mechanism, a shaft positively rotated thereby, a fixed escapement wheel coaxial with the shaft, a pawl-carrier fast on the shaft and provided with a pawl to coöperate with said wheel and stop rotation of the shaft, a pinion rotatable on the latter, a toothed segment connected with the pawl and meshing with the pinion, and a time movement to rotate the pinion continuously, said pinion thereby acting through the segment to throw out the pawl and permit an advance of the shaft, such advance moving the pawl-carrier ahead and causing the pinion and segment to move the pawl into engagement with the next tooth of the escapement wheel, combined with an operating connection between the shaft and the record-making devices.

21. In a time recorder, a minute marking wheel, an hour marking wheel advanced intermittingly thereby, motor mechanism, a shaft positively rotated thereby, a transmitting connection between said shaft and the minute marking wheel, a fixed escapement wheel coaxial with the shaft, a pawl-carrier fast on the shaft and provided with a pawl to coöperate with said escapement wheel and stop rotation of the shaft, and clock-controlled means to intermittingly disengage the pawl and permit the shaft and pawl-carrier to advance one step by the action of the motor mechanism, to thereby advance the minute-marking wheel one step.

22. In a time recorder, a plurality of sets of hour and minute type wheels bodily and independently movable into and out of printing position, a time-controlled instrumentality to drive said sets continuously, means to normally maintain the several sets in non-printing position, an actuating handle, and means controlled by movement of the handle in one direction to operatively connect it with any set of type wheels and thereafter by a different movement of the handle to position for printing the operatively connected set.

23. In a time recorder, a plurality of time-controlled printing sets, a pivotally mounted carrier for each set, the carriers normally retaining the printing sets in inactive position, a rocker bar behind the carriers, a transmitting member movable longitudinally of the rocker bar into position between it and any carrier, whereby operation of the bar will swing such carrier and move its printing set into active position, and means to position said transmitting member and also to operate the rocker bar.

24. In a time recorder, a series of co-axially fulcrumed, spring-retracted carriers, a printing set mounted on each carrier, a rocking member extending adjacent the series of carriers, and manually operated means to effect coöperation between said rocking member and any carrier and thereafter to rock said member and thereby swing the carrier on its fulcrum and bring the corresponding printing set to printing position.

25. In a workman's time recorder, in combination, a plurality of main printing sets bodily and independently movable to printing position, an auxiliary printing set adapted to make a "day" record upon a card, and means to select any one of the main printing sets and to thereafter move it and the auxiliary printing set to printing position.

26. In a workman's time recorder, in combination, bodily and independently movable main printing sets one of which is adapted at a given point of time to record by a single impression upon a card the amount of time between said point and the time of ending of a predetermined period of labor, another of the sets being adapted at a given point of time to record the elapsed time between said point and the time of commencement of a predetermined period of labor, a time movement controlling said sets, an auxiliary printing set adapted to make a "day" record on the card, means to advance such set automatically and daily, and mechanism to select any main printing set and thereafter to bring it and the auxiliary set into printing position.

27. In a workman's time recorder, in combination, time controlled printing sets adapted to record on a record-receiving member the lost time in definite but different periods of labor, means to determine which printing set shall be moved, and to move such set into recording position, and a device to prevent automatically such movement of a printing set during the period of labor in which another printing set should be operated and vice versa.

28. In a workman's time recorder, in combination, a plurality of time controlled recording devices movable independently into and out of operating position, said devices being adapted at a given point of time to record the lost time in definite but different periods of labor, manually operated means to select and move one of said devices into recording position, and means shifted automatically after the termination of each definite period to prevent the movement of a recording device to recording position during a period of labor in which another of said recording devices should be operated.

29. In a workman's time recorder, a time-movement, means controlled thereby adapted at a given point of time to record the elapsed time between said point and the time of commencement of a definite morning period of labor, means controlled by the time movement adapted at a given point of time to record the amount of time between said point and the time of ending of such morning period of labor, similarly controlled means to make corresponding records in a definite afternoon period of labor, means to determine which of the several recording means shall be operated and to effect the recording operation, and an automatically governed device to prevent the operation of afternoon record means during the morning period or the operation of morning record means during the afternoon period.

30. In a workman's time recorder, a plurality of bodily movable, time-controlled printing sets some of which are adapted to record lost time during a definite period of the day and other of which sets are adapted to record lost time during a different definite period of the day, additional time-controlled printing sets adapted to record actual time, means to select and move bodily to recording position any one of said printing sets, and means to automatically prevent such movement of particular sets during certain periods of the day.

31. In a workman's time recorder, a plurality of bodily movable, time-controlled printing sets some of which are adapted to record lost time during a definite period of the day and other of which sets are adapted to record lost time during a different definite period of the day, additional time-controlled printing sets adapted to record actual time, and means to select and move bodily to recording position a "lost time" or an "actual time" printing set.

32. In a workman's time recorder, a plurality of bodily movable, time-controlled printing sets some of which are adapted to record lost time during a definite period of the day and other of which sets are adapted to record lost time during a different definite period of the day, additional time-controlled printing sets adapted to record actual time, means to determine which set shall be moved and also to cause such set to be moved to recording position, and a stop shifted at predetermined times to prevent the last named action of the said means if certain sets are selected.

33. In a workman's time recorder, a plurality of bodily movable, time-controlled printing sets some of which are adapted to record lost time during a definite period of the day and other of which sets are adapted to record lost time during a different definite period of the day, additional time-controlled printing sets adapted to record actual time, means to determine which set shall be moved and to cause the selected set to be moved to recording position, and a stop shifted automatically and at predetermined periods to prevent the last named action of the said means with respect to certain printing sets and to permit such action with respect to other sets.

34. In a workman's time recorder, a plurality of bodily movable, time-controlled printing sets some of which are adapted to record lost time during a definite period of the day and other of which sets are adapted to record lost time during a different definite period of the day, additional time-controlled printing sets adapted to record actual time, an actuator having a selective movement to determine which set shall be moved and having a different operating movement to cause the selected set to be moved to recording position, an auxiliary printing set adapted to record a "day" character, means to effect a daily change in the said auxiliary set, and mechanism whereby each operating movement of the actuator moves the auxiliary printing set into recording position.

35. In a workman's time recorder, a plurality of bodily movable, time-controlled printing sets some of which are adapted to record lost time during a definite period of the day, and other of which sets are adapted to record lost time during a different definite period of the day, additional time-controlled printing sets adapted to record actual time, means to determine which set shall be moved and to cause the selected set to be moved to recording position, an auxiliary printing set adapted to record a "day" character, an instrumentality to effect a daily change in the said auxiliary set, and means whereby said auxiliary set is moved to recording position whenever any one of the other sets is so positioned.

36. In a time recorder, in combination, a plurality of time-controlled recording devices, means adapted to select and cause a relative movement of any one of said devices and a record-receiving member toward one another, and means to render inoperative said first-named means with respect to some of the recording devices during a period of each day while it continues operative with respect to other of the recording devices during such period.

37. In a time-recorder, in combination, printing means, means adapted to actuate said printing means to cause the impression made thereby to represent directly and exactly the lost time during working hours of the employee using the same upon each arrival and each departure, means to hold a record-receiving member in position to receive the impression from the printing means, and other printing means operated by the employee separately and independently of the first-named printing means to impress upon said record-receiving member the actual time of arrival and departure of the employee.

38. In a workman's time-recorder, in combination, a time movement, a motor mechanism, printing mechanism driven thereby and controlled by the time movement, and comprising a plurality of independently movable printing sets, and means to move any one of said printing sets into position to form a record on a record-receiving member, some of said printing sets being adapted to record a constant arbitrary character if operated prior to the commencement and other of the printing sets being adapted to record a constant arbitrary character if operated upon the termination, of a predetermined daily period.

39. In a workman's time-recorder, in combination, a time movement, a motor mechanism, printing mechanism driven thereby and controlled by the time movement, means to move said printing mechanism into position to form a record on a record-receiving member, said printing mechanism being adapted to record a constant arbitrary character if operated prior to the commencement, or upon the termination, of the regular daily periods of labor, and automatically shifted means to prevent the operation of the printing mechanism to make records for any but the current period of labor.

40. In a workman's time recorder, a card guide, a movable abutment to limit the depth of insertion of a card within said guide at different points and space the daily records in transverse columns, a plurality of printing mechanisms independently movable into position to form each its own record in said transverse columns, whereby the records of each of said mechanisms are substantially in different vertical columns, and means to cause any one of the printing mechanisms to make a record.

41. In a workman's time recorder, a card guide, a movable abutment to limit the depth of insertion of a card within said guide at different points and space the daily records in transverse columns, a plurality of printing mechanisms independently movable into position to form each its own record in said transverse columns, whereby the records of each of said mechanisms are substantially in vertical columns, and means to move any one of the printing mechanisms into printing position and cause it to make a record, combined with means to manually change the position of the abutment.

42. In a workman's time recorder, a card guide, a movable abutment to limit the depth of insertion of a card within said guide at different points and space the daily records in transverse columns, a plurality of printing mechanisms independently movable into position to form each its own record in said transverse columns, whereby the records of each of said mechanisms are substantially in different vertical columns, and means to cause any one of the printing mechanisms to make a record, combined with manually operated means to position said abutment, and an automatically controlled instrumentality to prevent the making of a record unless the abutment is positioned for the current day.

43. In a time recorder, in combination, a time controlled printing instrumentality, an actuator to effect the operation thereof to make a record, a guide or receiver for a record-receiving member, a movable stop to limit the depth of insertion of such member within the guide or receiver, manually operated means to position the stop independently of the position of the actuator, and a periodically changing instrumentality adapted to permit effective operation of the actuator only when the stop is positioned in accordance with the current period.

44. In a time recorder, in combination, a time controlled printing instrumentality, an actuator to effect the operation thereof to make a record, a guide or receiver for a record-receiving member, a movable stop to limit the depth of insertion of such member within the guide or receiver, manually operated means to position the stop independently of the position of the actuator, a detent device to retain the stop in one position until positively moved therefrom, and means changed automatically at the end of each day to prevent effective operation of the actuator unless the stop is positioned for the current day.

45. In a time recorder, in combination, a time controlled printing instrumentality movable into and out of printing position, an actuator to effect the movement thereof into position to make a record, a fixed guide or receiver for a record-receiving member, a movable stop to limit the depth of insertion of such member within the guide or receiver, manually operated means to position the stop, said means including a device located adjacent the actuator and having an angular movement relatively thereto corresponding to each change in the position of the stop and also movable in a different direction by engagement with the actuator only when the actuator is operated effectively, a controlling member adjacent said device and permitting the last named movement thereof and the effective operation of the actuator only when said device and the controlling member are in a certain relative position, and an instrumentality to shift periodically the controlling member, whereby the actuator cannot be effectively operated unless the stop in the guide is correspondingly positioned.

46. In a time recorder, the combination with a series of independently actuated time stamps, of a card receiver or guide, an actuator having a selective movement to determine which stamp shall act and having another operating movement to cause the selected stamp to mark a card in the receiver, a manually-released device to lock the actuator in any one of its selected positions while permitting operating movement thereof, a movable abutment to vary the effective depth of the card receiver, a manually movable stop operatively connected with the abutment and by which a change in the position of the latter is effected, and means including an automatically shifted controlling member, to prevent the operating movement of the actuator unless the stop has been manually moved into a predetermined position with relation to the controlling member.

47. In a time recorder, in combination, a receiver adapted to permit the insertion and withdrawal of individual record cards, a plurality of sets of clock controlled time-printing wheels, a member mounted to move in two directions, means connected with said member and acting upon movement thereof in one direction to determine which of such sets shall be operated, means adapted upon movement of said member in the other direction to cause the selected set to form a record upon a card in the receiver, and an independent, manually controlled device to determine the position of the card in the receiver when the set of printing wheels is caused to make a record.

48. In a time recorder, in combination, a receiver adapted to permit the insertion and withdrawal of individual record cards, a plurality of sets of clock controlled time printing wheels, a member pivotally mounted to swing in two directions, means connected therewith and acting upon swinging movement thereof in one direction to determine which of the sets of printing wheels shall be operated, means adapted upon swinging movement of said member in the other direction to cause the selected set to form a record upon a card in the receiver, a manually operated device to effect, after a regular period of daily labor, a change in the position of the card relatively to the card receiver, and automatically operating means to prevent the second named movement of the actuator unless the said manually operated device has been properly set for the current labor period.

49. In a time recorder, in combination, a receiver for a record card, a plurality of sets of printing wheels normally inoperatively positioned and movable independently toward the receiver into printing position, means common to all of said sets but coöperating therewith singly, to effect such movement, an instrumentality to determine which set shall be in coöperation with said means and also adapted to cause said means to effect the movement of the selected set to printing position, and means operated manually to cause a change in the position of a card in the receiver, from day to day.

50. In a workman's time recorder, in combination, a time-controlled printing set comprising hour and minute marking wheels adapted at a given point of time to record upon a record-receiving member the elapsed time between said point and the time of commencement of a predetermined period of labor, means whereby the minute wheel advances the hour wheel one step at the end of each hour, a second time-controlled printing set comprising hour and minute marking wheels adapted at a given point of time to record the amount of time between said point and the time of ending of a predetermined period of labor, means whereby the minute wheel imparts to the hour wheel two successive advances during the last minute of each hour and the first minute of the succeeding hour, respectively, said hour wheel having duplicate hour type and duplicate type indicating full time, whereby the full time character will be recorded at the termination of the predetermined period of labor and for a fixed period thereafter, and means to bring either printing set and a record-receiving member into coöperative relation.

51. In a workman's time recorder, in combination, a time-controlled printing set comprising hour and minute marking type-wheels adapted at a given point of time to record upon a record-receiving member the amount of time between said point and the time of ending of a predetermined period of labor, said hour wheel having the hour figures and a full time character duplicated thereon, means whereby the minute wheel imparts to the hour wheel an advance step in the last minute of each hour and a second advance step in the first minute of the next hour, to thereby cause full time to be recorded at the termination of the labor period and at any point of time during a fixed period following, and means to bring the printing set and a record-receiving member into coöperative relation.

52. In a workman's time recorder, in combination, a time-controlled printing set comprising hour and minute marking members adapted at a given point of time to record upon a record-receiving member the amount of time between said point and the time of ending of a predetermined period of labor, said hour member having duplicate full time characters, a single "no hour" character, and duplicate hour figures thereon, means whereby the hour member is advanced two successive steps in the last minute of the hour and the first minute of the next hour, to thereby cause full time to be recorded in the interval from the termination of the period of labor until the next full advance of the hour member, and means to bring the printing set and a record-receiving member into coöperative relation.

53. In a workman's time recorder, in combination, a plurality of time-controlled printing sets, some of the sets being adapted at a given point of time to record upon a record-receiving member the elapsed time between said point and the time of commencement of a fixed period of labor, others of the sets being adapted at a given point of time to record the amount of time between said point and the time of ending of the fixed period of labor, and means whereby the last-named printing sets will record full time at the termination of such period of labor and for a predetermined length of time thereafter.

54. In a workman's time recorder, in combination, a time-controlled printing set comprising hour and minute marking members adapted at a given point of time to record upon a record-receiving member the amount of time between said point and the time of ending of a fixed period of labor, and means whereby the hour member will record full time at the termination of such period of labor and will make a like record for a predetermined length of time thereafter.

55. In a workman's time recorder, in combination, a time-controlled printing set comprising hour and minute marking members adapted at a given point of time to record upon a record-receiving member the amount of time between said point and the time of ending of a fixed period of labor, and means whereby an arbitrary character will be recorded by such printing set at the termination of such period of labor and for a predetermined length of time thereafter.

56. In a workman's time recorder, in combination, a time-controlled printing set comprising hour and minute marking members adapted at a given point of time to record upon a record-receiving member the amount of time between said point and the time of ending of a fixed period of labor, type disposed upon the hour marking member to duplicate a "full time" character, and means to effect a double advance of said member every hour whereby the "full time" character will be recorded at the termination of the fixed period of labor and during the succeeding interval until the next hourly advance.

57. In a workman's time recorder, in combination, a time-controlled printing set comprising hour and minute marking members adapted at a given point of time to record upon a record-receiving member the amount of time between said point and the time of ending of a fixed period of labor, duplicate full time characters, a "no hour" character, a set of duplicate hour figures, and a blank of greater height than the latter, interposed between said series and the full time characters, the latter and the blank being higher than the hour figures, all disposed upon the hour marking member, and means to advance the latter whereby the full time character will be recorded at the termination of the fixed period of labor and for a predetermined length of time thereafter, the blank thereafter making a smudge on the record-receiving member and by its height preventing the minute marking member from making a record.

58. In a workman's time recorder, a recording instrumentality comprising a plurality of main printing sets adapted to make records during different portions of a day upon a record-receiving card, a motor to drive said printing sets, a time-movement to control the operation of the motor, an auxiliary printing set adapted to record a daily character on the card, a receiver for a card, means to cause any one of the main printing sets and the auxiliary set to simultaneously make records upon a card in the receiver, said auxiliary set comprising a rotatable type-wheel and a swinging support therefor, and a periodically changing mechanism also controlled by the time-movement to shift or change the type-wheel at the end of each day.

59. In a workman's time recorder, in combination, a card receiver or guide, a time-recording instrumentality to make records upon a card in the receiver showing the amount of time utilized by a workman during fixed daily labor periods, an auxiliary instrumentality to record on the card a different character each day of the week, whenever the time-recording instrumentality is operated, mechanism to automatically effect a daily shift of the auxiliary instrumentality, and manually operated means to first disconnect said auxiliary instrumentality and the shifting mechanism and thereafter to shift or set such parts at will.

60. In a workman's time recorder, in combination, a card receiver or guide, a time-recording instrumentality to make records upon a card in the receiver showing the amount of time utilized by a workman during fixed daily labor periods, an auxiliary instrumentality to record on the card a different character each day of the week, whenever the time-recording instrumentality is operated, mechanism to automatically effect a daily shift of the auxiliary instrumentality, a normally operative connection between said mechanism and said instrumentality, and manually operated means adapted to render said connection inoperative and thereafter set ahead for one day the auxiliary instrumentality each time such means is actuated.

61. In a workman's time recorder, in combination, a card receiver or guide, a time-recording instrumentality manually movable into position to make records upon a card in the receiver showing the amount of time utilized by a workman during fixed daily labor periods, an actuating handle having an operating movement to cause said instrumentality to make a record, an angularly movable, manually set pointer provided with a stop pin and adapted to be moved in an axial direction by the operating movement of the handle, means controlled by angular movement of the pointer to regulate the effective depth of the card receiver, a periodically changing mechanism, a disk rotated step by step thereby at predetermined intervals of time, said disk being coaxial with the pointer and having an aperture to receive the stop pin, and a time-movement to control the operation of said mechanism, the disk preventing axial movement of the pointer and hence operating movement of the actuating handle unless the angular positions of the aperture and the stop pin coincide.

62. In a workman's time recorder, in combination, a card receiver or guide, a time-recording instrumentality manually movable into position to make records upon a card in the receiver showing the amount of time utilized by a workman during fixed daily labor periods, an actuating handle having an operating movement to cause said instrumentality to make a record, an angularly movable, manually set pointer provided with a stop pin and adapted to be moved in an axial direction by the operating movement of the handle, means controlled by angular movement of the pointer to regulate the effective depth of the card receiver, a disk coaxial with the pointer and having an aperture to receive the stop pin, and time-controlled mechanism to effect a predetermined angular advance of the disk each day, the disk preventing axial movement of the pointer and the operating movement of the actuating handle unless the stop pin is opposite the aperture in the disk, whereby the effective depth of the card receiver must be changed manually for every advance of the disk before the apparatus can be operated to make a record.

63. In a workman's time recorder, in combination, a plurality of sets of printing wheels, each set being movable bodily and independently toward and from printing position, a time-movement controlling all of said sets, a manually operated actuating device to select and move to printing position any of said sets, a card receiver or guide in front of the sets of printing wheels and having its sides curved rearwardly near their upper ends, a platen to act upon the back of a record-receiving card and cause the same to be bent or bulged at the printing point, the curvature of the sides of the receiver permitting such bending, and means whereby said platen is actuated when the said actuating device is operated.

64. In a workman's time recorder, in combination, a plurality of sets of printing wheels, each set being movable bodily and independently toward and from printing position, a time-movement controlling all of said sets, a platen, a card receiver open back and front and interposed between the platen and the sets of printing wheels, an actuator, and means operated by manual movement of the actuator to bring any one of the sets of printing wheels to printing position and thereafter to cause the platen to act upon the back of the card and force its face against the positioned printing-wheels.

65. In a workman's time recorder, in combination, a set of printing wheels, a time-movement controlling said set, a platen, a card receiver open back and front and interposed between the platen and the set of printing wheels, an actuator, means to curve the card oppositely to the curvature of the printing wheels, and means operated by manual movement of the actuator to cause the platen to act upon the back of the card and force its face against the printing wheels, and transmit a hammer blow to the card, to make a record thereon.

66. In a workman's time recorder, in combination, a time-controlled printing instrumentality, a card receiver or guide in front thereof, said receiver having rearwardly curved portions adjacent the printing point, a platen to engage the back of a card in the receiver and bend it to present a convex surface to receive the record, and means to effect movement of the platen to bend the card and cause a record to be made thereon by the printing instrumentality.

67. In a workman's time recorder, in combination, a time-controlled printing instrumentality, a card receiver or guide in front thereof, a platen to engage the back of a card in the receiver, means to cause the platen to engage and convex the card with respect to said instrumentality, and means to thereupon act automatically upon said platen and cause the same to make the impression on the card.

68. In a workman's time recorder, in combination, a time-controlled printing instrumentality, a card receiver or guide in front thereof, a platen to engage the back of a card in the receiver, an actuator, connections between it and the printing instrumentality to move the latter to printing position, other connections between said actuator and the platen to effect a yielding movement of the latter against the card and press it toward the printing instrumentality, and means operated by the latter connections to transmit a hammer blow through the platen to make the impression on the card.

69. In a workman's time recorder, in combination, a time-controlled printing instrumentality, a card receiver or guide in front thereof, a platen to engage the back of a card in the receiver, an actuator, connections between it and the printing instrumentality to move the latter to printing position, other connections between said actuator and the platen to effect a yielding movement of the latter against the card and press it toward the printing instrumentality, the latter connections including a link pivotally connected with the platen and provided with a stud, a pivotally mounted, spring-actuated hammer, and means to retract the hammer and suddenly release it, the released hammer striking a sharp, quick blow on the stud, said stud and link transmitting the effect of the hammer-blow to the platen to make the impression upon the face of the card.

70. In a workman's time recorder, in combination, a time-movement, a printing instrumentality, a spring motor to drive it, said motor being controlled by the time movement, an actuator to effect the operation of the printing instrumentality to make a record on a card, a card receiver, a manually movable abutment to determine the depth to which a card may be inserted therein, whereby the card is positioned for records on successive days, means to prevent the operation of the actuator to make a record unless the abutment is properly positioned for the current day, a spring motor, an escapement between it and the said means, to operate the latter intermittingly, said escapement including an intermittently rotated, spring-actuated member and a detent therefor rendered inoperative at predetermined intervals, and controlling connections between the escapement and the time-movement, each release of said member causing the escapement to effect a predetermined advance of the means which govern the operation of the actuator.

71. In a time recorder, a plurality of sets of hour and minute type wheels bodily and independently movable into and out of printing position, means to normally maintain the several sets in non-printing position, an actuating handle, having a selective movement in one path to operatively connect it with any set of type wheels and having an operating movement in a different path to position for printing the operatively connected set.

72. In a time recorder, a plurality of sets of hour and minute type wheels bodily and independently movable into and out of printing position, means to normally maintain the several sets in non-printing position, and actuating means having a selective movement to operatively connect it with any set of type wheels and having an operating movement to position for printing the operatively connected set.

73. In a workman's time recorder, in combination, a plurality of time-controlled printing sets arranged side by side, a fixed card receiver or guide, a manually controlled actuator having a selective movement to determine which printing set shall make a record, and having an operating movement to cause the selected set to make a record on a card in the receiver, a movable, manually positioned abutment to determine the effective depth of the receiver, a rotatable controlling member having an aperture, a stop interposed between said member and the actuator and having an angular movement and also a movement toward the controlling member, connections between the abutment and stop, whereby a change in the position of one is accompanied by a corresponding change in the other, and automatic means to rotate the controlling member one step at the end of each day, the stop preventing operating movement of the actuator unless the said stop is positioned opposite the aperture in the controlling member, the abutment being thereby properly set for the current day.

74. In a workman's time recorder, in combination, a fixed card receiver or guide, a time-recording instrumentality manually movable into position to make records upon a card in the receiver showing the amount of time utilized by a workman during fixed daily labor periods, an auxiliary instrumentality to record on the card a different character each day of the week, whenever the time-recording instrumentality is operated, a visual indicator operatively connected with said auxiliary instrumentality to display to the workman the current day of the week, mechanism to automatically effect a daily shift of the auxiliary instrumentality and the indicator, a normally operative connection between said mechanism and said instrumentality and the indicator, and manually operated means adapted to render said connection inoperative and thereafter set ahead for one day the auxiliary instrumentality and the indicator each time such means is actuated.

75. In a workman's time recorder, in combination a set of printing wheels, a time-movement controlling it, a card receiver or guide in front of said printing wheels and having its sides curved rearwardly near their upper ends, a platen to act upon the back of a record-receiving card in the receiver and cause the same to be bent or bulged at the printing point, the curvature of the sides of the receiver permitting such bending, and means to effect actuation of the platen.

76. In a workman's time recorder, in combination, time controlled printing sets adapted to record on a record-receiving member the lost time in definite but different periods of labor, means to determine which printing set shall make a record, and a device to prevent automatically the making of a record by one printing set during the period of labor in which another printing set should be operated.

77. In a workman's time recorder, in combination, time controlled printing sets adapted to make records on a record receiving member, means to determine which printing set shall make a record, and a device to prevent automatically the making of a record by one printing set during the period of labor in which another printing set should be operated.

78. In a workman's time recorder, a plurality of time-controlled printing sets some of which are adapted to record lost time during a definite period of the day and other of which sets are adapted to record lost time during a different definite period of the day, additional time-controlled printing sets adapted to record actual time, means to determine which of said printing sets shall make a record, and means to automatically prevent the making of records by particular sets during certain periods of the day.

79. In a workman's time recorder, a plurality of time-controlled printing sets some of which are adapted to record lost time during a definite period of the day and other of which sets are adapted to record lost time during a different definite period of the day, additional time-controlled printing sets adapted to record actual time, and means to cause a "lost time" or an "actual time" printing set to make a record.

In testimony whereof, I have signed my name to this specification, in the presence of two subscribing witnesses.

CHARLES T. HAWLEY.

Witnesses:
THATCHER B. DUNN,
HELEN F. GOODSPEED.